US011847725B2

(12) United States Patent
Price et al.

(10) Patent No.: US 11,847,725 B2
(45) Date of Patent: Dec. 19, 2023

(54) PERFORMING INTERACTIVE DIGITAL IMAGE OPERATIONS UTILIZING MODIFIED MACHINE LEARNING MODELS

(71) Applicant: Adobe Inc., San Jose, CA (US)

(72) Inventors: Brian Price, San Jose, CA (US); Fanqing Lin, Provo, UT (US)

(73) Assignee: Adobe Inc., San Jose, CA (US)

( * ) Notice: Subject to any disclaimer, the term of this patent is extended or adjusted under 35 U.S.C. 154(b) by 197 days.

(21) Appl. No.: 17/502,296

(22) Filed: Oct. 15, 2021

(65) Prior Publication Data

US 2023/0120232 A1  Apr. 20, 2023

(51) Int. Cl.
*G06T 11/60* (2006.01)
*G06N 3/084* (2023.01)
*G06N 3/10* (2006.01)

(52) U.S. Cl.
CPC .............. *G06T 11/60* (2013.01); *G06N 3/084* (2013.01); *G06N 3/10* (2013.01)

(58) Field of Classification Search
CPC ...... G06N 3/0475; G06N 3/084; G06N 3/094; G06N 3/0442; G06N 3/10; G06N 3/0464; G06N 3/091; G06N 3/09; G06T 11/60; G06T 11/00; G06T 2207/20081; G06T 2207/20084
See application file for complete search history.

(56) References Cited

U.S. PATENT DOCUMENTS 9,940,551 B1 * 4/2018 Mordvintsev ....... G06F 18/2413
2010/0322489 A1   12/2010 Tizhoosh et al.
2021/0090251 A1    3/2021 Jha et al.
2021/0150783 A1 *  5/2021 Arberet ................. G06N 3/045
2021/0190892 A1 *  6/2021 Yap .......................... G06N 3/08
2021/0407080 A1 * 12/2021 Szu ........................ G16H 10/40
2023/0229121 A1 *  7/2023 Hopf ........................ G06N 3/08
                                                                    700/29

OTHER PUBLICATIONS

Sofiiuk; Konstantin et al.; "f-BRS: Rethinking Backpropagating Refinement for Interactive Segmentation" Aug. 25, 2020; arXiv:2001.10331v3 [cs.CV].
Examination Report as received in GB application GB2211526.5 dated Feb. 8, 2023.

* cited by examiner

*Primary Examiner* — Phi Hoang
(74) *Attorney, Agent, or Firm* — Keller Preece PLLC

(57) ABSTRACT

The present disclosure relates to systems, methods, and non-transitory computer readable media for performing interactive digital image editing operations utilizing machine learning models and a feature backpropagation refinement layer. For example, the disclosed systems perform interactive digital image editing operations by incorporating a feature backpropagation refinement layer within a non-interactive machine learning model that utilizes a consistency loss to adjust the feature backpropagation refinement layer according to one or more user interactions. In some embodiments, the disclosed systems utilize a feature backpropagation refinement layer that includes a bias sublayer for localizing changes to a digital image and a convolutional sublayer for channel-wise scale and feature combinations across channels. In some cases, the disclosed systems utilize a consistency loss that facilitates localized modifications to a digital image based on distances of various pixels or features from a user interaction.

20 Claims, 21 Drawing Sheets

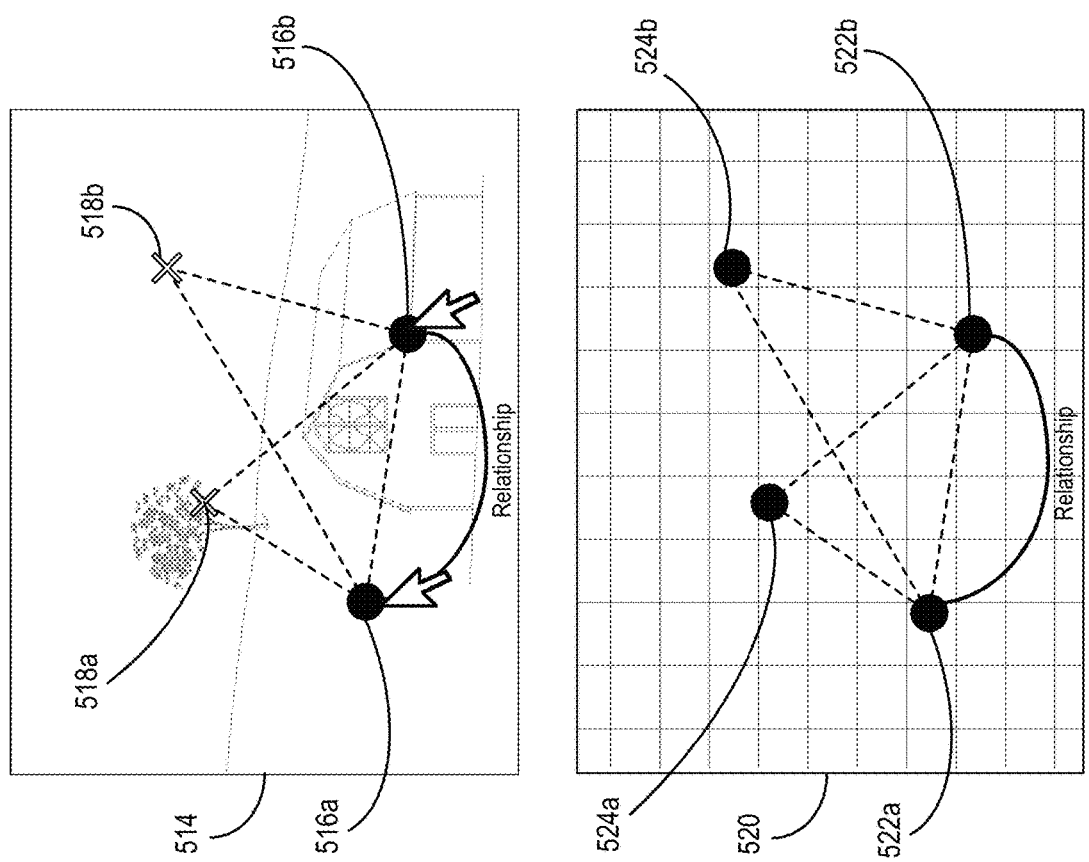

PERFORMING INTERACTIVE DIGITAL IMAGE OPERATIONS UTILIZING MODIFIED MACHINE LEARNING MODELS

BACKGROUND

Existing hardware and software platforms provide systems and methods for modifying digital images utilizing machine learning models. For example, some existing image modification systems utilize various types of machine learning models to generate or modify digital images for different tasks such as semantic segmentation, depth estimation, style transfer, and others. Despite these advances, however, many conventional image modification systems continue to demonstrate a number of deficiencies, particularly in flexibility, accuracy, and efficiency.

As just suggested, many conventional image modification systems are inflexible. In particular, existing systems are often limited to generating or modifying digital images in an automatic fashion by analyzing an input digital image to generate an output digital image. However, due to the rigid nature of many neural network architectures, conventional systems are limited to manipulating or modifying digital images using only learned parameters of their pretrained layers. Indeed, many existing systems utilize machine learning models that are trained as black box models, where user interactions are not part of the training process. Even for existing systems that attempt to incorporate user interaction with a machine learning model, these systems usually require training a model based on user interaction at the outset and cannot adapt automatic (e.g., non-interactive) models for interactive use.

In addition, some conventional image modification systems inaccurately generate modified digital images. To elaborate, many existing systems generate modified digital images that do not accurately reflect the pertinent digital image editing task. For example, if a client seeks to segment a particular object portrayed in a digital image, conventional systems often erroneously include or exclude certain pixels. With black box machine learning models, conventional systems cannot leverage learned neural network features to correct predictions of the neural network.

Accordingly conventional systems often generate a predicted modification to a digital image via a neural network and then rely on separate image editing tools for a user to manually edit any errors in the prediction. However, this approach leads to significant inefficiencies. Indeed, because the image editing tools are not part of the neural network, these separate tools cannot utilize learned features of the neural network to intelligently correct the generated predictions. Rather, these tools require significant user interactions and user interfaces that increase time and computing resources needed to generate a modified digital image. Moreover, because these image editing tools are almost entirely dependent on client device interactions to refine the digital image, the resulting modifications are still often inaccurate and imprecise.

For those existing systems that attempt to incorporate user interaction with a machine learning model, these existing systems nevertheless frequently generate inaccurate digital images. Indeed, some existing systems utilize model architectures that inaccurately (or that cannot) account for differences across locations of a digital image when modifying the digital image in response to user interaction. Consequently, based on receiving a user interaction to modify a digital image generated by a machine learning model, conventional systems often generate a modified digital image by changing pixels across the entire digital image utilizing the machine learning model, even if the user interaction indicates only a select few pixels to change within the initial digital image.

Thus, there are a variety of disadvantages regarding conventional image modification systems.

SUMMARY

This disclosure describes one or more embodiments of systems, methods, and non-transitory computer readable media that solve one or more of the foregoing or other problems in the art with a machine learning model architecture that includes a feature backpropagation refinement layer for performing interactive digital image editing operations. Indeed, in some embodiments, the disclosed systems can utilize a non-interactive machine learning model to perform interactive digital image editing based on user input. For example, the disclosed systems perform interactive digital image editing operations by incorporating a feature backpropagation refinement layer within a machine learning model that scales and/or biases features generated by learned parameters of the machine learning model in accordance with interactive user input. For example, the disclosed systems can refine a segmentation map, an image matte, a depth map, an inpainted digital image, or a stylized digital image based on user input that intelligently emphasizes features generated by learned parameters of a neural network to align with user inputs.

In some embodiments, the disclosed systems utilize a feature backpropagation refinement layer that includes a bias sublayer for localizing changes to a digital image and a convolutional sublayer for channel-wise scale and feature emphasis across channels. In some cases, the disclosed systems utilize a consistency loss that facilitates modifications to a digital image based on distances of various pixels or features from a user interaction. By utilizing the described feature backpropagation refinement layer and/or consistency loss, the disclosed systems can flexibly, efficiently, and accurately generate enhanced digital images by refining digital image outputs in a localized fashion in response to user interaction, even in machine learning models that are not trained to accommodate user inputs.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which:

FIGS. 5A-5B illustrate examples of determining a consistency loss in accordance with one or more embodiments;

DETAILED DESCRIPTION

Figure 1:
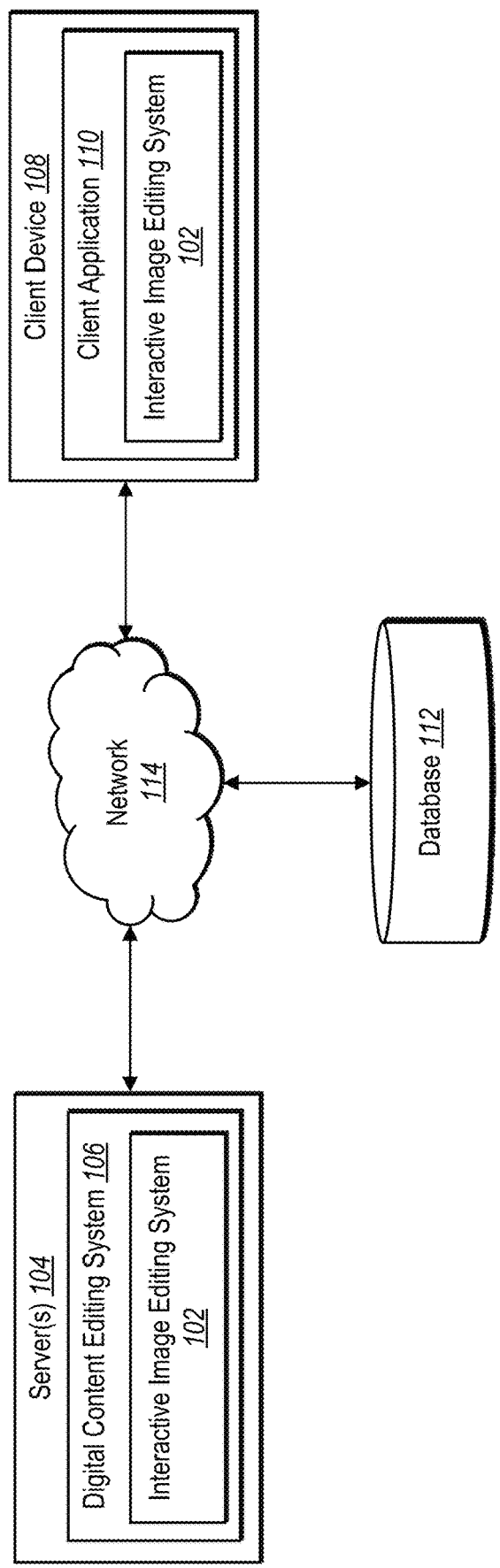
FIG. 1 illustrates an example system environment in which an interactive image editing system operates in accordance with one or more embodiments.

This disclosure describes one or more embodiments of an interactive image editing system that utilizes a feature backpropagation refinement layer of a machine learning model to accurately and flexibly modify digital images utilizing interactive user input. In particular, in some embodiments, the interactive image editing system modifies a non-interactive machine learning model such as a non-interactive neural network (e.g., a neural network not trained based on user interaction) to accommodate user input in generating refined digital images (e.g., image segmentations, image mattes, depth maps, etc.). To convert a non-interactive neural network into an interactive neural network, in certain embodiments, the interactive image editing system utilizes a modified neural network architecture that includes a specialized, feature backpropagation refinement layer. For example, the feature backpropagation refinement layer includes additional components such as a bias sublayer and a convolutional sublayer, each with parameters that are modifiable in response to user interaction. In some cases, the interactive image editing system further (or alternatively) utilizes a consistency loss to inform the modification of model parameters based on user interaction.

As just mentioned, in one or more embodiments, the interactive image editing system modifies or refines a digital image based on user interaction with the digital image. Specifically, in some embodiments, the interactive image editing system incorporates a feature backpropagation refinement layer and utilizes a consistency loss to modify outputs of a neural network architecture that is ordinarily non-interactive. Consequently, in certain embodiments, the interactive image editing system converts or transforms a non-interactive neural network into an interactive neural network for modifying or refining a digital image responsive to user interaction.

In one or more embodiments, the interactive image editing system generates a modified digital image from an initial digital image. For example, the interactive image editing system utilizes a neural network including layers trained for a particular task such as semantic segmentation, image matting, depth estimation, hole filling, or style transfer to generate a modified digital image, such as a segmentation map, an image matte, a depth map, an inpainted digital image, or a stylized digital image. In some cases, the neural network includes the (non-interactive) layers trained for one or more of the aforementioned tasks along with other (interactive) layers such as feature backpropagation refinement layer that includes a bias sublayer and a convolutional sublayer tunable based on user interaction.

In addition, in certain embodiments, the interactive image editing system receives or detects a user interaction selecting one or more pixels of a modified digital image. In response to the user interaction, in some embodiments, the interactive image editing system updates or modifies bias parameters of the bias sublayer and scale parameters of the convolutional sublayer. For instance, in response to the user interaction, the interactive image editing system backpropagates to modify bias parameters of the bias sublayer and scale parameters of the convolutional sublayer.

In some cases, the interactive image editing system backpropagates to reduce a measure of loss associated with the user interaction. For example, the interactive image editing system can determine a cross-entropy loss, an L1 loss or an L2 loss based on the user interaction (e.g., a user interaction identifies a set of pixels that are incorrectly labeled, leading to a cross-entropy loss corresponding to the user interaction). Moreover, the interactive image editing system can determine a consistency loss that penalizes or punishes modifications or refinements to pixels (or their corresponding features) based on respective distances from a user interaction. Indeed, in some cases, the interactive image editing system applies a consistency loss function such that pixels (or features) farther from the user interaction are less likely to change during backpropagation. Additionally, in one or more embodiments, the interactive image editing system backpropagates to reduce the measure of loss (e.g., to reduce a cross-entropy loss and a consistency loss) by modifying bias parameters of the bias sublayer and scale parameters of the convolutional sublayer.

In one or more embodiments, the interactive image editing system further generates a refined digital image. For instance, the interactive image editing system generates a refined digital image utilizing the modified parameters of the feature backpropagation refinement layer (e.g., the modified bias parameters of the bias sublayer and modified scale parameters of the convolutional sublayer) together with the learned parameters of the other neural network layers. In some cases, the interactive image editing system generates a refined digital image by correcting or modifying one or more pixels from the modified digital image (e.g., the digital image generated before the most recent user interaction).

For example, the interactive image editing system generates a refined digital image for one or more tasks such as semantic segmentation, image matting, depth mapping, hole filling, or style transfer. Indeed, in certain embodiments, the interactive image editing system utilizes a different neural network for each task, where the neural network is trained for its specific tasks, including layers and neurons tuned to generate a particular output. For instance, the interactive image editing system utilizes a semantic segmentation neural network for semantic segmentation, an image matting neural network for image matting, a depth mapping neural network for depth mapping, an inpainting neural network for hole filling (e.g., a generative adversarial neural network), or a style transfer neural network for style transfer. As mentioned, in some cases, each of the aforementioned neural networks include a feature backpropagation refinement layer and/or a consistency loss for interactive application, even where the other layers of the neural network are not interactive.

As suggested above, embodiments of the interactive image editing system can provide a variety of advantages over conventional image modification systems. For example, embodiments of the interactive image editing system can improve flexibility over conventional image modification systems. Whereas many existing systems utilize rigid, black-box neural networks that generate outputs (e.g., without user interaction), embodiments of the interactive image editing system augment (or utilize augmented) neural networks or other machine learning models for adapting to interactive tasks. For instance, unlike conventional systems, embodiments of the interactive image editing system utilize a feature backpropagation refinement layer and/or a consistency loss to adapt and apply non-interactive neural networks for updating or refining digital images in response to user interaction, at run time.

Even compared to existing systems that train a neural network based on user interaction, embodiments of the interactive image editing system still provide improved flexibility. For example, some prior systems have learned parameters trained based on historical user inputs, but apply those learned parameters to new user inputs. In contrast, the interactive image editing system can modify parameters of a feature backpropagation refinement layer, at run time, to align modified digital images to user input. Accordingly, the interactive image editing system can actively and dynamically modify the inner-workings of a neural network when the neural network is being applied. Moreover, unlike prior systems that are rigidly fixed to specific use cases such as semantic segmentation (e.g., as a result of their model training), the interactive image editing system utilizes a feature backpropagation refinement layer that is adaptable to many different neural network architectures for many different image editing tasks such as semantic segmentation, depth estimation, style transfer, hole filling, and image matting.

Additionally, embodiments of the interactive image editing system also improve accuracy over conventional image modification systems. Specifically, unlike conventional systems that rely on separate image editing tools that cannot leverage learned neural network features to make image edits, the interactive image editing system incorporates a feature backpropagation refinement layer and/or a consistency loss to leverage learned features in generating refined digital images. Indeed, rather than relying on separate tools with independent features to correct predictions of a non-interactive neural network, the interactive image editing system utilizes a modified neural network that includes a feature backpropagation refinement layer with updatable parameters to modify internal network features in response to user interaction. This approach also has the benefit of improving efficiency by avoiding excessive, unnecessary time, user interactions, and user interfaces required by conventional systems to modify digital images utilizing separate, unintelligent tools. Indeed, with a single click, the interactive image editing system can refine digital image outputs to correct errors in segmentation, matting, depth mapping, hole-filling, style transfer, or other image editing tasks.

As another example of accuracy improvements, while some prior systems can incorporate some user interaction, these existing systems nevertheless inaccurately modify pixels throughout digital images based on user interaction (e.g., by modifying pixels far away from the user interaction). Some embodiments of the interactive image editing system, on the other hand, utilize a bias map (e.g., as part of the feature backpropagation refinement layer) and/or a consistency loss to more accurately modify targeted pixels of a digital image. For instance, in response to a user interaction indicating one or more pixels of a digital image, the interactive image editing system utilizes a bias map and/or a consistency loss to accurately update or modify the digital image by penalizing changes to pixels (or corresponding features) based on respective distances from the user interaction.

As suggested by the foregoing discussion, this disclosure utilizes a variety of terms to describe features and benefits of the interactive image editing system. Additional detail is hereafter provided regarding the meaning of these terms as used in this disclosure. In particular, the term "neural network" refers to a machine learning model that can be trained and/or tuned based on inputs to determine classifications or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data. For example, a neural network can include a convolutional neural network, a recurrent neural network (e.g., an LSTM), a graph neural network, or a generative adversarial neural network.

As an example, the term "non-interactive neural network" refers to a neural network having parameters that are not learned or trained based on user interactions (e.g., a user interaction input channel). For example, a non-interactive neural network includes one or more layers that operate independently of user interaction inputs. In particular, a non-interactive neural network can include a neural network that is not trained based on sample user interactions (e.g., where no channels or layers in the neural network process or analyze user interactions in making predictions). For instance, a non-interactive neural network includes one or more neural network layers having learned parameters that are determined without utilizing sample user interactions during a training process for the neural network. A non-interactive neural network can include a feature backpropagation refinement layer that adds an interactive component capable of modifying internal network parameters in response to user interaction.

As just mentioned, in some embodiments, the interactive image editing system utilizes a modified neural network architecture that includes a feature backpropagation refinement layer. As used herein, the term "feature backpropagation refinement layer" refers to a layer within a neural network that modifies or updates parameters based on user interaction (e.g., user interaction at run time). For example, a feature backpropagation refinement layer includes bias parameters and scale parameters for biasing and scaling features (e.g., for channel-wise biasing and/or channel-wise scaling) for various digital image tasks. Indeed, in some cases, a feature backpropagation refinement layer includes a bias sublayer and a convolutional sublayer that begin with initialized unlearned parameters (e.g., zeros or ones) that are then modified based on user inputs to emphasize intermediate (e.g., latent) features within the neural network.

As used herein, the term "bias sublayer" refers to a sublayer within a feature backpropagation refinement layer that includes bias parameters for biasing features based on a user interaction. For example, a bias sublayer can refer to a channel-wise bias sublayer that biases or emphasizes feature modifications across respective channels of features extracted from a digital image. As another example, a bias sublayer can refer to a bias map that localizes changes to neural network features based on a location of a user interaction. To illustrate, a bias sublayer can add a bias parameter value to an input feature to emphasize/deemphasize the input feature. In the above or other examples, a bias sublayer includes bias parameters that are modifiable to reduce or otherwise update a measure of loss. For example, "bias parameters" refer to neural network parameters such as weights or biases of a bias sublayer that are modifiable based on user interaction to adjust how extracted (e.g., latent) features within a neural network are biased or localized.

Indeed, as used herein, the term "bias map" refers to a bias sublayer (e.g., a two-dimensional map) that localizes changes to neural network features at particular locations corresponding to a digital image. For example, a bias map can apply different bias parameters to different pixels or feature regions in a digital image. In some cases, a bias map includes dimensions corresponding to dimensions of a digital image (or of features extracted from a digital image)]. Thus, in some cases, a bias map that applies different bias parameters to different regions of a feature map within a neural network.

Additionally, as used herein, the term "convolutional sublayer" refers to a sublayer that is part of the feature backpropagation refinement layer and that includes scale parameters for scaling neural network features. For example, a convolutional sublayer includes scale parameters for increasing, decreasing, or otherwise scaling feature weights to generate neural network features for a digital image (e.g., by adding or otherwise combining feature weights). To illustrate, a convolutional layer can multiply a feature weight by a scale parameter that is applied to an input feature to emphasize/deemphasize that feature within a neural network. The convolutional layer can then add/combine the results to generate an output feature. In some cases, a convolutional sublayer is modifiable on a channel-wise basis to adjust extracted feature channels. In some embodiments, a convolutional sublayer has a first dimension corresponding to a number of extracted feature channels and a second dimension corresponding to a dimension of a digital image from which features are extracted. Relatedly, as used herein, the term "scale parameters" refers to neural network parameters such as weights that, as part a convolutional sublayer, are modifiable based on user interaction to adjust scaling of extracted (e.g., latent) features. In some embodiments, a convolutional sublayer and/or a scale parameter applies to localized areas or regions of a digital image while a bias map applies at a global level across the entire digital image. In other embodiments, a bias map applies to localized areas while a convolutional sublayer and/or a scale parameter applies globally.

As mentioned, in one or more embodiments, the interactive image editing system determines a consistency loss based on a user interaction. As used herein, the term "consistency loss" refers to a measure of loss that is based on one or more distances of extracted features (or corresponding pixels of a digital image) in relation to features (or pixels) indicated by a user interaction. For example, a consistency loss penalizes changes or modifications to features or pixels based on relative distance to a user interaction. In some cases, a consistency loss reduces a likelihood of modifying features or pixels farther from a user interaction, where features or pixels closer to the user interaction are more likely to be modified. In this manner, the consistency loss improves consistency between an initial output and a modified/refined output of a neural network with regard to regions further away from a particular user input.

The interactive image editing system can also utilize other measures of loss. As used herein, a measure of loss can include a metric or value reflecting an error, inconsistency, or inaccuracy. For example, in addition to a consistency loss, the interactive image editing system can utilize a relationship loss (determined based on a relationship indicated by one or more user interactions) such as cross-entropy loss, an L1 loss, an L2 loss, mean squared error, or another measure of loss. Indeed, as mentioned above, the interactive image editing system can combine a consistency loss together with one or more other losses. For instance, the interactive image editing system can determine an L1 loss in response a negative user interaction indicating incorrect pixel values (e.g., an incorrect segmentation) in an area of the user interaction, and the interactive image editing system utilizes the L1 loss and a consistency loss to correct pixel values without distorting/modifying other portions of the digital image.

Additional detail regarding the interactive image editing system will now be provided with reference to the figures. For example, FIG. 1 illustrates a schematic diagram of an example system environment for implementing an interactive image editing system 102 in accordance with one or more embodiments. An overview of the interactive image editing system 102 is described in relation to FIG. 1. Thereafter, a more detailed description of the components and processes of the interactive image editing system 102 is provided in relation to the subsequent figures.

As shown, the environment includes server(s) 104, a client device 108, a database 112, and a network 114. Each of the components of the environment communicate via the network 114, and the network 114 is any suitable network over which computing devices communicate. Example networks are discussed in more detail below in relation to FIG. 12.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 12. Although FIG. 1 illustrates a single instance of the client device 108, in some embodiments, the environment includes multiple different client devices, each associated with a different user (e.g., a digital content editor). The client device 108 communicates with the server(s) 104 via the network 114. For example, the client device 108 provides information to server(s) 104 indicating client device interactions (e.g., digital image selections, user interactions with one or more pixels of a digital image, or other input) and receives information from the server(s) 104 such as modified and/or refined digital images. Thus, in some cases, the interactive image editing system 102 on the server(s) 104 provides and receives information based on client device interaction via the client device 108.

As shown in FIG. 1, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. Based on instructions from the client application 110, the client device 108 presents or displays information to a user, including digital images such as segmentation digital images, digital image mattes, digital image depth maps, inpainted digital images, and/or stylized digital images.

As illustrated in FIG. 1, the environment includes the server(s) 104. The server(s) 104 generates, tracks, stores, processes, receives, and transmits electronic data, such as indications of one or more pixels of a digital image. For example, the server(s) 104 receives data from the client device 108 in the form of an indication of a client device interaction to correct of update one or more pixels of a digital image. In response, the server(s) 104 transmits data to the client device 108 to cause the client device 108 to display or present a refined digital image based on the interaction.

In some embodiments, the server(s) 104 communicates with the client device 108 to transmit and/or receive data via the network 114. In some embodiments, the server(s) 104 comprises a distributed server where the server(s) 104 includes a number of server devices distributed across the network 114 and located in different physical locations. The server(s) 104 can comprise a content server, an application server, a communication server, a web-hosting server, a multidimensional server, or a machine learning server. The server(s) 104 can further access and utilize the database 112 to store and retrieve information such as an initial digital image, a modified digital image generated prior to user interaction, a refined digital image generated based on user interaction, and a digital image neural network including a feature backpropagation refinement layer and/or a consistency loss function.

As further shown in FIG. 1, the server(s) 104 also includes the interactive image editing system 102 as part of a digital content editing system 106. For example, in one or more implementations, the digital content editing system 106 can store, generate, modify, edit, enhance, provide, distribute, and/or share digital content, such as digital images. For example, the digital content editing system 106 provides tools for the client device 108, via the client application 110, to manipulate pixels of digital images to modify the appearance of a digital image by adding, removing, or manipulating objects within the digital image. In some implementations, the digital content editing system 106 provides tools for refining digital images by utilizing a digital image neural network that includes a feature backpropagation refinement layer to correct one or more pixels based on user interaction.

In one or more embodiments, the server(s) 104 includes all, or a portion of, the interactive image editing system 102. For example, the interactive image editing system 102 operates on the server(s) to generate refined digital images based on user interaction. In some cases, the interactive image editing system 102 utilizes, locally on the server(s) 104 or from another network location (e.g., the database 112), a digital image neural network including a feature backpropagation refinement layer and/or a consistency loss function, to generate refined digital images based on user interaction.

In certain cases, the client device 108 includes all or part of the interactive image editing system 102. For example, the client device 108 can generate, obtain (e.g., download), or utilize one or more aspects of the interactive image editing system 102, such as a digital image neural network including a feature backpropagation refinement layer and/or a consistency loss function from the server(s) 104. Indeed, in some implementations, as illustrated in FIG. 1, the interactive image editing system 102 is located in whole or in part of the client device 108. For example, the interactive image editing system 102 includes a web hosting application that allows the client device 108 to interact with the server(s) 104. To illustrate, in one or more implementations, the client device 108 accesses a web page supported and/or hosted by the server(s) 104.

Although FIG. 1 illustrates a particular arrangement of the environment, in some embodiments, the environment has a different arrangement of components and/or may have a different number or set of components altogether. For instance, as mentioned, the interactive image editing system 102 is implemented by (e.g., located entirely or in part on) the client device 108. In addition, in one or more embodiments, the client device 108 communicates directly with the interactive image editing system 102, bypassing the network 114. Further, in some embodiments, the environment includes a digital image neural network including a feature backpropagation refinement layer and/or a consistency loss function stored in the database 112, maintained by the server(s) 104, the client device 108, or a third-party device.

Figure 2:
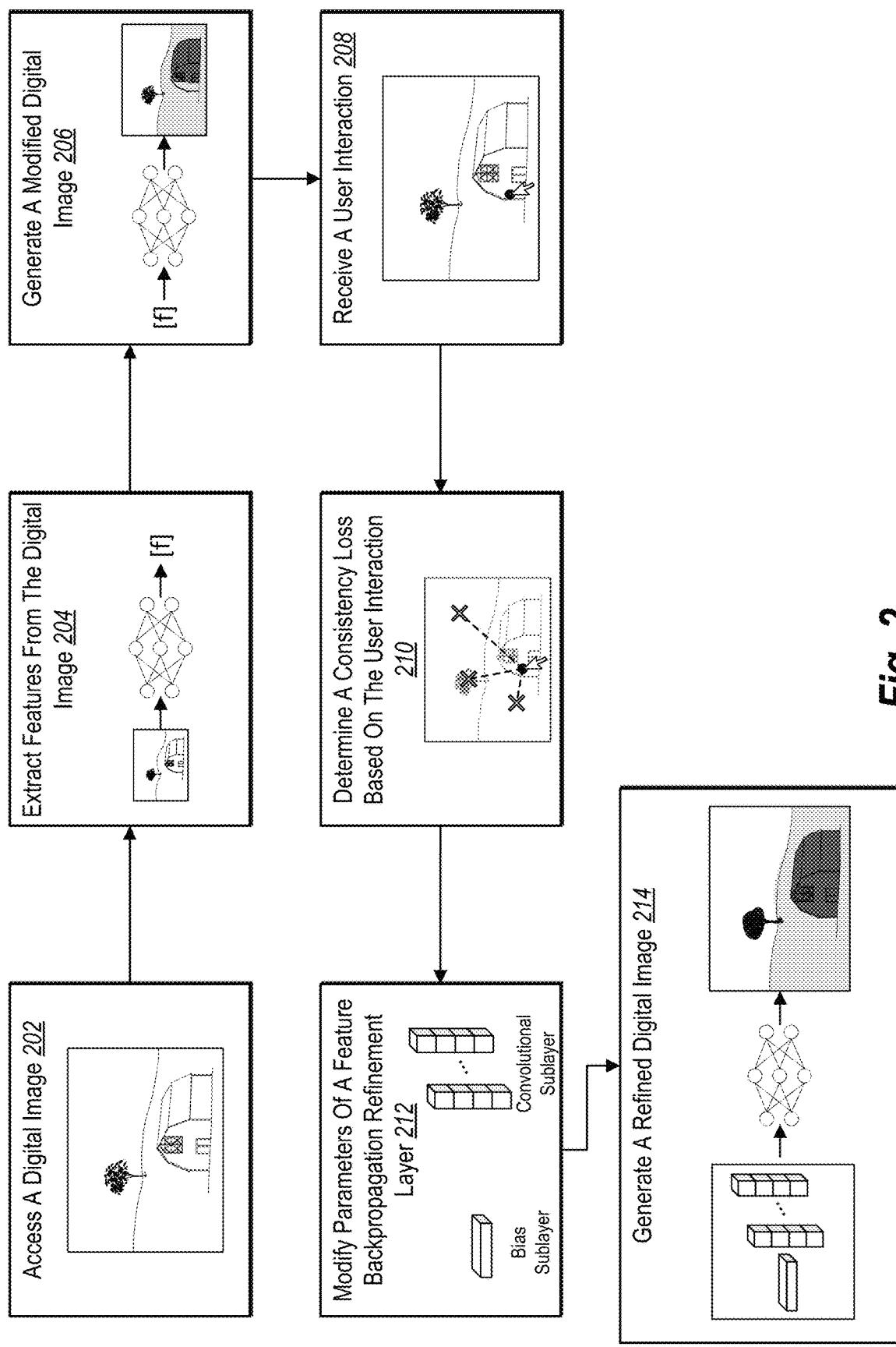
FIG. 2 illustrates an overview of generating a refined digital image based on backpropagating to modify parameters of a feature backpropagation refinement layer in response to user interaction in accordance with one or more embodiments.

As mentioned, in one or more embodiments, the interactive image editing system 102 generates a refined digital image based on user interaction utilizing a digital image neural network that includes a feature backpropagation refinement layer and/or a consistency loss function (in addition to other loss functions). In particular, the interactive image editing system 102 generates a refined digital image by modifying or refining one or more pixels of a digital image in accordance with parameters updated within the feature backpropagation refinement layer in response to a user interaction. FIG. 2 illustrates an overview of generating a refined digital image utilizing a neural network based on user interaction. Additional detail regarding the various acts described in relation to FIG. 2 is provided below with reference to subsequent figures.

As illustrated in FIG. 2, the interactive image editing system 102 performs an act 202 to access a digital image. In particular, the interactive image editing system 102 accesses a digital image from a database (e.g., the database 112) or receives a digital image as an upload from a client device (e.g., the client device 108). For example, the interactive image editing system 102 receives or detects user interaction from the client device 108 selecting a digital image. As shown, the interactive image editing system 102 accesses or receives a digital image depicting a barn in a field with a tree in the background.

As further illustrated in FIG. 2, the interactive image editing system 102 performs an act 204 to extract features from the digital image. In particular, the interactive image editing system 102 extracts features utilizing one or more layers of a digital image neural network. For instance, the interactive image editing system 102 extracts features (e.g., latent features) utilizing neural network layers having learned parameters. In some cases, the interactive image editing system 102 utilizes a non-interactive neural network with one or more layers having parameters learned without user interaction as part of the training process. Indeed, the interactive image editing system 102 extracts features that represent the digital image and that are interpretable by the neural network, but that are not necessarily interpretable to a human observer.

In addition, the interactive image editing system 102 performs an act 206 to generate a modified digital image. More specifically, the interactive image editing system 102 generates a modified digital image from the initial digital image accessed via the act 202. For example, the interactive image editing system 102 generates a modified digital image in the form of a segmentation digital image, a digital image matte, a digital image depth map, an inpainted digital image, or a stylized digital image. To generate the modified digital image, the interactive image editing system 102 utilizes one or more layers of a neural network specific to the applicable task, such as a segmentation neural network, an image matting neural network, a depth mapping neural network, an inpainting neural network, or a style transfer neural network.

In some cases, the neural network also includes a feature backpropagation refinement layer with unlearned parameters (e.g., unlearned bias parameters for a bias sublayer and unlearned scale parameters for a convolutional sublayer) initialized with values that do not affect the generation of the modified digital image prior to user interaction. For example, the interactive image editing system 102 utilizes learned parameters of certain layers tailored to generate the modified digital image and passes features through the feature backpropagation refinement layer without affecting the modified digital image. In some cases, to prevent unwanted errors in the modified digital image, the interactive image editing system 102 initializes the parameters of the feature backpropagation refinement layer (e.g., the bias parameters and the scale parameters) at certain values. For instance, the interactive image editing system 102 initializes the scale parameters to have values of 1 (because multiplying by 1 leaves the features unchanged) and initializes the bias parameters to have values of 0 (because adding 0 leaves the features unchanged).

As further illustrated in FIG. 2, the interactive image editing system 102 performs an act 208 to receive a user interaction. In particular, the interactive image editing system 102 receives a user interaction from the client device 108 in the form of a selection of one or more pixels of the modified digital image. For example, the interactive image editing system 102 receives a click of a single pixel, a click-and-drag over multiple pixels, a box selection of a group of pixels, a first click of a first set of pixels and a second click of a second set of pixels, or some other form of user interaction with the modified digital image. In some embodiments, the interactive image editing system 102 receives a user interaction to correct one or more pixels of the modified digital image that a user notices are incorrect or flawed in some way. As shown, the interactive image editing system 102 receives a user interaction indicating pixels of the barn that are incorrectly segmented.

Additionally, the interactive image editing system 102 performs an act 210 to determine a consistency loss (or another measure of loss) based on the user interaction. To elaborate, the interactive image editing system 102 determines a consistency loss associated with the user interaction. Indeed, in response to receiving a user interaction, the interactive image editing system 102 determines distances between features extracted from a digital image and/or distances between pixels corresponding to the extracted features. For example, the interactive image editing system 102 determines distances from the one or more pixels indicated by the user interaction to other pixels within the digital image (e.g., the initial digital image or the modified digital image). As another example, the interactive image editing system 102 determines distances from features within a feature map (e.g., extracted from the initial digital image) associated with the pixels indicated by the user interaction and features within the feature map associated with other pixels of the digital image.

In one or more embodiments, the act 210 involves determining other losses in addition to a consistency loss. For example, the interactive image editing system 102 determines an L1 loss, an L2 loss, a cross-entropy loss, or other relational losses to encourage changing pixel values associated with a user interaction. In some cases, the interactive image editing system 102 uses an L1 loss (or some other loss) in conjunction with a negative user interaction to correct pixel values of (and in an area surrounding) a selected pixel. For instance, the interactive image editing system 102 uses an L1 loss together with a consistency loss to encourage modifying certain pixel values in response to a negative user interaction indicating incorrect pixel values. Indeed, the L1 loss can encourage changing pixel values of the digital image that are the same as (or similar to) the pixel values of a selected pixel. By also using the consistency loss with the L1 loss, the interactive image editing system 102 can prevent changing pixel values for pixels farther from the selected pixel, even if those pixel values are very similar to those of the selected pixel. In other cases, the interactive image editing system 102 uses a different loss and/or different type of user interaction (e.g., for a positive user interaction indicating correct pixel values and/or a user for a relationship between pixels of successive user interactions).

Based on the distances of features or pixels from a user interaction, the interactive image editing system 102 determines a consistency loss to penalize changes or modifications according to the distances. For example, the interactive image editing system 102 utilizes a consistency loss to reduce the likelihood of changing features or pixels farther from the user interaction. In some cases, the interactive image editing system 102 penalizes refinements of pixels or features proportionally to the distance of the pixels or features from the user interaction. In these or other cases, the interactive image editing system 102 utilizes a different relationship such as a threshold distance. For instance, the interactive image editing system 102 penalizes refinements to features or pixels that are beyond a threshold distance from the user interaction. In these or other embodiments, the interactive image editing system 102 utilizes a consistency loss for features generated by intermediate layers of a digital image neural network and, in some cases, utilizes multiple consistency losses for features generated at multiple different locations of the digital image neural network.

As further illustrated in FIG. 2, the interactive image editing system 102 performs an act 212 to modify parameters of a feature backpropagation refinement layer. In particular, the interactive image editing system 102 modifies parameters to reduce the total measure of loss (e.g., consistency loss and/or other losses). For example, the interactive image editing system 102 backpropagates to adjust or update bias parameters of a bias sublayer and/or scale parameters of a convolutional sublayer. In some cases, the interactive image editing system 102 modifies the bias parameters and the convolutional layers to reduce the measures of loss determined in response to the user interaction.

Additionally, the interactive image editing system 102 performs an act 214 to generate a refined digital image. More specifically, the interactive image editing system 102 generates a refined digital image from the modified digital image utilizing the digital image neural network. Indeed, the interactive image editing system 102 generates the refined digital image utilizing the modified bias parameters and the modified scale parameters in addition to parameters of one or more other layers of the digital image neural network. For example, the interactive image editing system 102 generates the refined digital image with corrected pixels. As shown, the refined digital image correctly segments the pixels of the barn in the modified digital image that were initially segmented incorrectly.

Figures 3A, 3B:
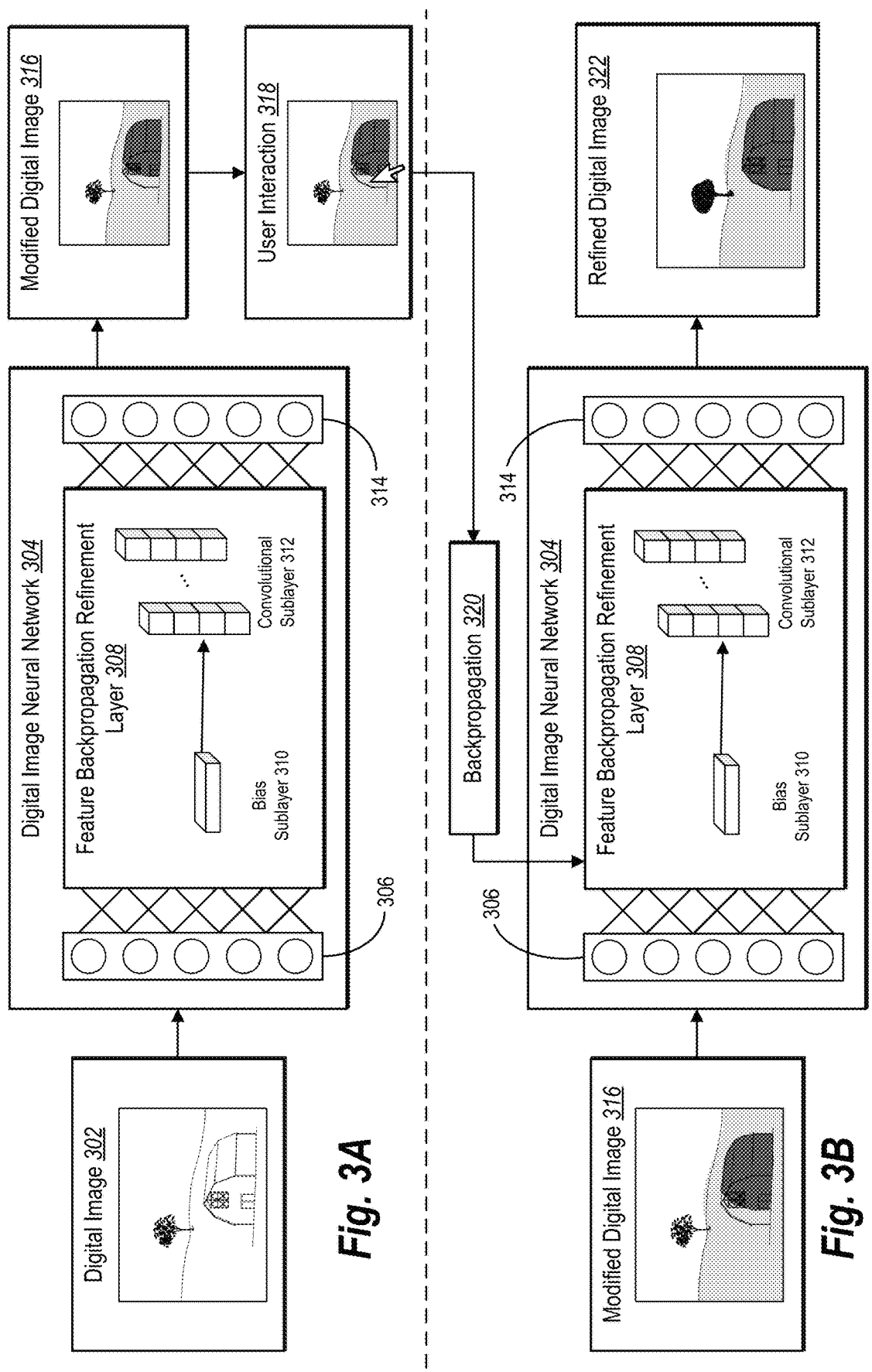
FIGS. 3A-3B illustrate an example backpropagation to modify parameters of a feature backpropagation refinement layer in accordance with one or more embodiments.

As mentioned above, in some embodiments, the interactive image editing system 102 generates a refined digital image utilizing modified parameters of a feature backpropagation refinement layer within a neural network. In particular, the interactive image editing system 102 updates or modifies parameters of the feature backpropagation refinement layer based on user interaction to correct one or more pixels of a modified digital image. FIGS. 3A-3B illustrate backpropagating to update parameters of a feature backpropagation refinement layer to generate a refined digital image in accordance with one or more embodiments.

As illustrated in FIG. 3A, the interactive image editing system 102 utilizes a digital image neural network 304 to analyze or process a digital image 302. In particular, the interactive image editing system 102 accesses or receives the digital image 302 and inputs the digital image 302 into the digital image neural network 304. For example, the interactive image editing system 102 utilizes one or more layers 306 and 314 with learned parameters determined during training. Specifically, the interactive image editing system 102 extracts features from the digital image 302 utilizing a first set of layers 306. In other embodiments, the interactive image editing system 102 utilizes a digital image neural network with a different architecture (e.g., a different structure for the feature backpropagation refinement layer).

In addition, digital image neural network 304 passes information or data between various layers to generate a modified digital image 316. More specifically, the digital image neural network 304 passes extracted features from the first set of layers 306 to the feature backpropagation refinement layer 308. In turn, the feature backpropagation refinement layer 308 analyzes the extracted features utilizing the bias sublayer 310 and the convolutional sublayer 312. As mentioned, the interactive image editing system 102 initializes bias parameters of the bias sublayer 310 and further initializes scale parameters of the convolutional sublayer 312. For instance, the interactive image editing system 102 initializes the bias parameters (e.g., at 0s) and the scale parameters (e.g., at 1s) to retain, or refrain from modifying, values of the extracted features. In some embodiments, the bias sublayer 310 processes the extracted features utilizing unlearned bias parameters initialized at 0 (e.g., to add 0s to the extracted features), leaving the extracted features unchanged. Additionally, the convolutional sublayer 312 processes the extracted features utilizing unlearned scale parameters initialized at 1 (e.g., to multiply extracted features by 1), leaving the extracted features unchanged.

As further illustrated in FIG. 3A, the digital image neural network 304 further passes extracted features from the feature backpropagation refinement layer 308 to a set of layers 314. In turn, the additional set of layers 314 processes the extracted features to generate the modified digital image 316. As shown, the interactive image editing system 102 utilizes the digital image neural network 304 to generate the modified digital image 316 in the form of a segmentation digital image. As also shown, some pixels of the barn within the modified digital image 316 are incorrectly segmented after the first pass through the digital image neural network 304 (e.g., the light gray pixels on the left side of the barn).

As also illustrated in FIG. 3A, the interactive image editing system 102 receives a user interaction 318. More specifically, the interactive image editing system 102 receives a user interaction selecting or indicating one or more pixels of the modified digital image. For example, the interactive image editing system 102 receives a user interaction in the form of a click or a tap selecting one or more pixels within the portion of the barn that is incorrectly segmented. As another example, the interactive image editing system 102 receives a user interaction specifically outlining a set of pixels within the portion of the barn that is incorrectly segmented.

As illustrated in FIG. 3B, the interactive image editing system 102 performs a backpropagation 320 in response to the user interaction 318. To elaborate, the interactive image editing system 102 receives the user interaction 318 and, in response to the user interaction 318, backpropagates to update or modify parameters of the digital image neural network 304. Specifically, the interactive image editing system 102 backpropagates to modify internal parameters such as weights and biases within the feature backpropagation refinement layer 308. In some cases, the interactive image editing system 102 modifies bias parameters of the bias sublayer 310 and/or modifies scale parameters of the convolutional sublayer 312. By modifying the bias parameters and/or the scale parameters, the interactive image editing system 102 adjusts or recalibrates how the feature backpropagation refinement layer 308 processes and passes data, thereby modifying how the feature backpropagation refinement layer 308 generates output features.

In one or more embodiments, the interactive image editing system 102 backpropagates to reduce a measure of loss associated with the user interaction 318. More specifically, the interactive image editing system 102 determines a measure of loss associated with the user interaction 318 by utilizing a consistency loss function (and/or other loss functions as mentioned above) to compare pixels indicated by the user interaction 318 (or their corresponding extracted features from the digital image 302) with other pixels of the modified digital image 316 (or their corresponding extracted features from the digital image 302). For example, the interactive image editing system 102 determines a location of one or more pixels indicated or selected by the user interaction 318 within the modified digital image 316. In addition, the interactive image editing system 102 determines a consistency loss based on distances from the one or more selected pixels to other pixels of the modified digital image 316.

In some cases, the interactive image editing system 102 determines distances between features within a feature map. For instance, the interactive image editing system 102 generates a feature map (with dimensions corresponding to dimensions of the digital image 302) utilizing the bias sublayer 310 to determine locations of features extracted from the digital image 302. In addition, the interactive image editing system 102 determines features indicated by the user interaction 318 and further determines distances from those features to other features within the feature map. The interactive image editing system 102 further determines a measure of consistency loss according to the distances of features (or pixels) from the user interaction, where features (or pixels) with larger distances are weighted to penalize refinement more than features (or pixels) with smaller distances. Thus, the interactive image editing system 102 performs the backpropagation 320 to reduce the measure of loss, focusing refinement of parameters of the feature backpropagation refinement layer 308 (e.g., the bias parameters and the scale parameters) to features or pixels closer to the user interaction 318.

After the backpropagation 320, the feature backpropagation refinement layer 308 generates, from the features received from the first set of layers 306, output features to pass to the second set of layers 314. Indeed, the interactive image editing system 102 utilizes second set of layers 314 (that include parameters learned via training) to generate the refined digital image 322 from the features passed by the feature backpropagation refinement layer 308. As shown, the interactive image editing system 102 generates the refined digital image 322 that depicts correctly segmented pixels. Indeed, in response to the user interaction 318, the interactive image editing system 102 backpropagates and utilizes the interactive nature of the feature backpropagation refinement layer 308 to generate the refined digital image 322 to correct the segmentation of the pixels on the left side of the barn (e.g., near the user interaction).

Figure 4A:
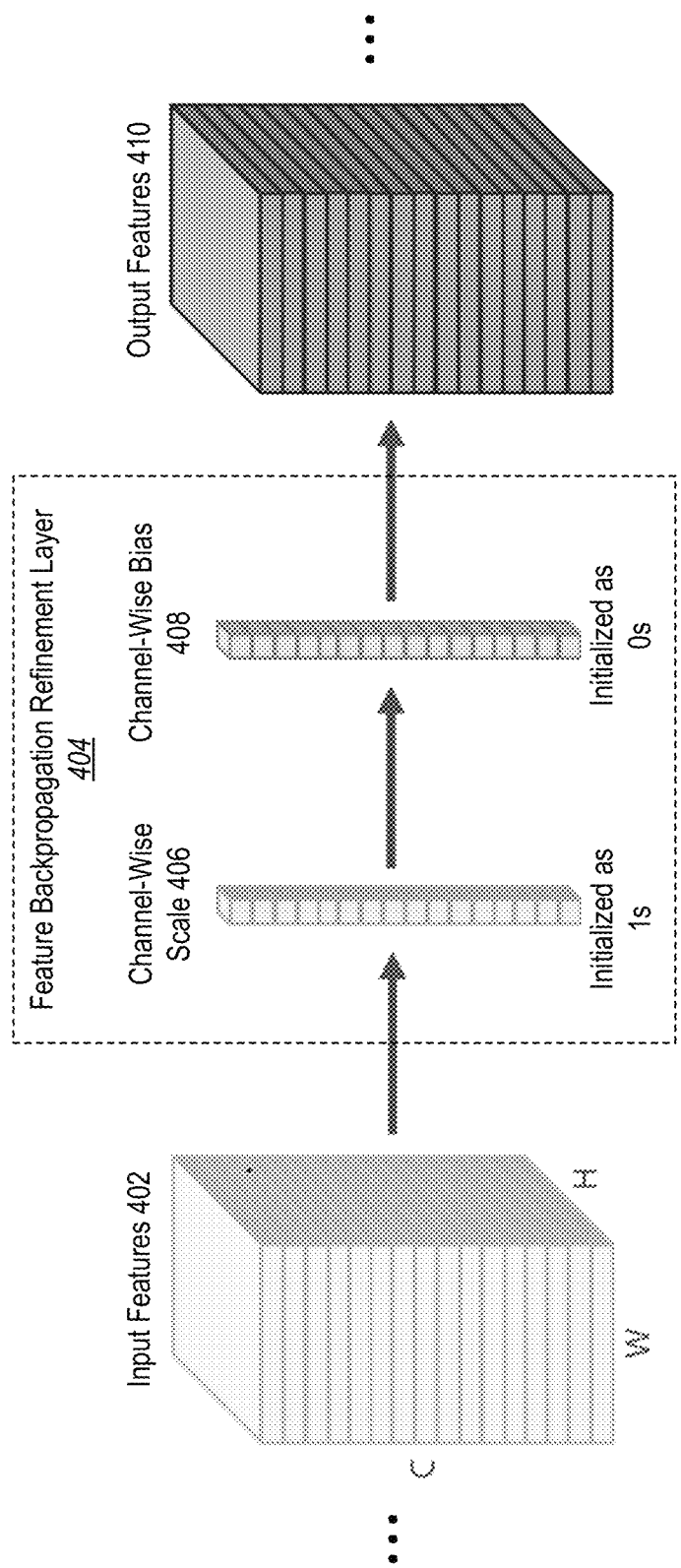
FIGS. 4A-4B illustrate example architectures for a feature backpropagation refinement layer in accordance with one or more embodiments.
Figure 4B:
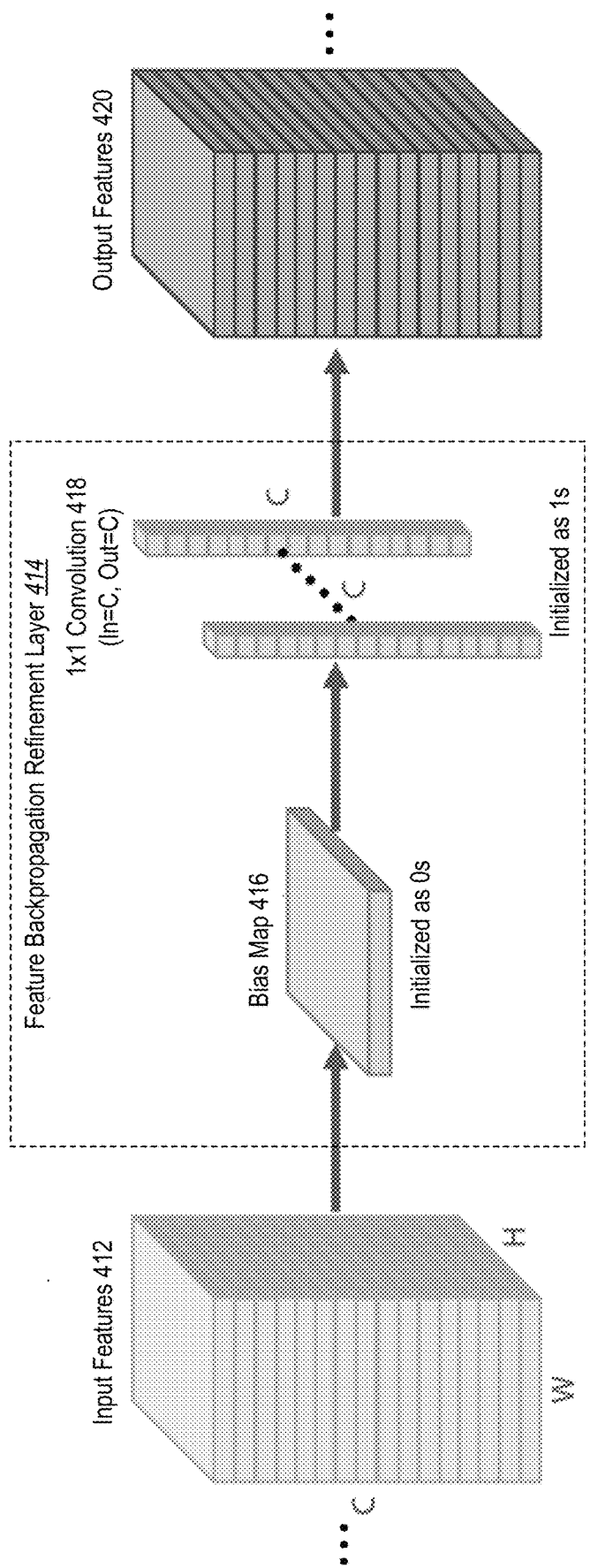

As mentioned above, in certain described embodiments, the interactive image editing system 102 utilizes a feature backpropagation refinement layer (e.g., the feature backpropagation refinement layer 308) to generate a set of output features from a set of input features. In particular, in some embodiments the interactive image editing system 102 utilizes multiple feature backpropagation refinement layers throughout a neural network architecture, where each feature backpropagation refinement layer analyzes or process a set of input features from previous layers to generate a set of output features to pass to subsequent layers. FIGS. 4A-4B illustrate example arrangements for a feature backpropagation refinement layer in accordance with one or more embodiments.

As illustrated in FIG. 4A, the interactive image editing system 102 generates a set of input features 402. In particular, the interactive image editing system 102 generates the input features 402 utilizes previous layers of a digital image neural network (e.g., the digital image neural network 304) having parameters learned via training. For example, the interactive image editing system 102 extracts the input features 402 utilizes one or more trained neural network layers to analyze, and extract features from, a digital image. As shown, the input features 402 have dimensions corresponding to dimensions of an input digital image, with a width (W) and a height (H) matching (or proportional to) a width and height of the input digital image. In addition, the interactive image editing system 102 extracts the input features 402 in a number of feature channels (C). For instance, the interactive image editing system 102 extracts features in channels, where separate channels represent or include different (types of) features. In some cases, the interactive image editing system 102 extracts different feature channels corresponding to different attributes (visible or otherwise) of an input digital image.

As also illustrated in FIG. 4A, the interactive image editing system 102 initializes the parameters of the feature backpropagation refinement layer 404 (e.g., before receiving user interaction). Indeed, the interactive image editing system 102 initializes the parameters of the convolutional sublayer 406 and the bias sublayer 408 such that the output features 410 match the input features 402 prior to backpropagation (in response to a user interaction) to update the parameters. For instance, the interactive image editing system 102 initializes the scale parameters to all have values of 1 and initializes the bias parameters to all have values of 0 for each channel.

In one or more embodiments, the interactive image editing system 102 trains a (or utilizes a pretrained) neural network that does not include a feature backpropagation refinement layer 404. Indeed, because the initializations for scale and bias do not change the output of the feature backpropagation refinement layer 404, the interactive image editing system 102 can train other layers of a neural network and then subsequently add or insert one or more instances of the feature backpropagation refinement layer 404 into the neural network. In some cases, the interactive image editing system 102 trains a neural network that includes the feature backpropagation refinement layer 404 while fixing (or not modifying) values of the feature backpropagation refinement layer 404.

In response to a user interaction indicating one or more pixels of a digital image, the interactive image editing system 102 utilizes a feature backpropagation refinement layer 404 (e.g., the feature backpropagation refinement layer 308) to process or analyze the input features 402. More specifically, the interactive image editing system 102 utilizes the feature backpropagation refinement layer 404 to generate a set of output features 410 from the input features 402. For example, the interactive image editing system 102 utilizes a feature backpropagation refinement layer 404 that includes a convolutional sublayer 406 and a bias sublayer 408.

As shown, in some embodiments, the convolutional sublayer 406 and the bias sublayer 408 do not have width and height dimensions corresponding to those of the input features 402 (or an input digital image). Rather, the convolutional sublayer 406 and the bias sublayer 408 process features on a channel-wise basis. For instance, the convolutional sublayer 406 scales features within each channel of the input features 402 according to channel-specific scale parameters. In addition, the bias sublayer 408 biases the input features 402 on a channel-wise basis to emphasize or modify features utilizing channel-specific bias parameters.

Based on utilizing the feature backpropagation refinement layer 404 to analyze or process the input features 402, the interactive image editing system 102 generates the output features 410. Specifically, the interactive image editing system 102 generates the output features 410 to pass to additional layers of a digital image neural network (e.g., the digital image neural network 304). As shown, the interactive image editing system 102 generates the output features with dimensions matching those of the input features 402.

As mentioned above, the interactive image editing system 102 can modify the parameters within the feature backpropagation refinement layer 404 based on user input. In particular, the interactive image editing system 102 can modify the parameters of the convolutional sublayer 406 and the bias sublayer 408 based on a consistency loss (and/or other losses mentioned above). For example, the interactive image editing system 102 can determine a consistency loss that encourages consistency (e.g., penalizes change) in pixels/regions that are further away from a user interaction. This avoids efficiency and accuracy problems from conventional systems which modify portions of a digital image that are not adjacent to or near a user input. Indeed, conventional systems will often modify pixels that are a far distance from a user interaction, which requires additional, unnecessary user interactions to correct changes that were not needed/desired in the first instance. By utilizing a consistency loss, the interactive image editing system 102 can improve architectures utilized by conventional systems.

As illustrated in FIG. 4B, in certain embodiments, the interactive image editing system 102 utilizes a feature backpropagation refinement layer having a different structure or architecture. Indeed, rather than the channel-wise bias sublayer 408 of FIG. 4A, FIG. 4B illustrates a feature backpropagation refinement layer 414 including a bias sublayer in the form of a two-dimensional bias map 416. For instance, the feature backpropagation refinement layer 414 includes a two-dimensional bias map 416 that includes bias features for localizing changes or refinements to features or pixels. Indeed, utilizing the two-dimensional bias map 416 the interactive image editing system 102 can apply bias parameters to isolated pixels/regions and more accurately account for localized refinement of a digital image.

As shown, the interactive image editing system 102 initializes the bias map 416 (to all 0s) and the convolutional sublayer 418 (e.g., to all 1s) to leave the input features 412 unaffected prior to user interaction. Indeed, prior to user interaction, the output feature 420 match the input features 412. In response to a user interaction, the interactive image editing system 102 updates the parameters of the feature backpropagation refinement layer 414 and modifies the input features 412 to generate the output features 420 via the updated parameters (e.g., updated bias parameters and updated scale parameters).

Specifically, the interactive image editing system 102 passes the set of input features 412 into the feature backpropagation refinement layer 414, whereupon the bias map 416 localizes the input features 412 according to bias parameters. Indeed, the interactive image editing system 102 applies the bias parameters of the bias map 216 to generate a (two-dimensional) biased feature map. In particular, a biased feature map refers to one or more features that have been modified based on a bias sublayer. For example, the bias map 416 generates a biased feature map that emphasizes/de-emphasizes features at various locations within the input features 412 according to its bias parameters. As shown, the bias map 416 has one or more dimensions (e.g., a width and a height) corresponding to dimensions of the input features 412 (or corresponding to an input digital image). Indeed, the bias map 416 is two-dimensional to match the two-dimensional input features 412 (or a two-dimensional input digital image). In some embodiments, the bias map 416 has dimensions of N, H, W where, N represents a batch size (e.g., N=1), H represents an input feature height, and W represents an input feature width. Thus, the bias map 416 generates a feature map that maps features to specific coordinate locations (e.g., according to bias parameters) across the various channels of the input features 412.

In one or more embodiments, the feature backpropagation refinement layer 414 includes multiple bias maps layered or stacked together. For example, rather than including only a single bias map 416 for generating a feature map across all feature channels, the feature backpropagation refinement layer 414 includes two or three (or more) bias maps for localizing across different sets of feature channels. For instance, the feature backpropagation refinement layer 414 can include a first bias map that localizes feature changes for a first set of feature channels of the input features 412, a second bias map that localizes feature changes for a second set of feature channels, and a third bias map that localizes feature changes for a third set of feature channels.

As further illustrated in FIG. 4B, the feature backpropagation refinement layer 414 includes a convolutional sublayer 418. In particular, the convolutional sublayer 418 includes at least one dimension corresponding to a dimension (e.g., a width or a height) of the input features 412 (or the input digital image). In addition, the convolutional sublayer 418 includes another dimension corresponding to the number of channels within the set of input features 412. Thus, the convolutional sublayer 418 scales features (e.g., features of the feature map generated via the bias map 416) using 1×1 convolutions across the various channels. For instance, the convolutional sublayer 418 includes a number of 1×1 convolutions corresponding to a dimension of the input features 412 (e.g., a width or a height), where each 1×1 convolution includes the same number of channels as the input features 412. In some cases, the convolutional sublayer 418 includes convolutions of different dimensions (e.g., 2×2 or 3×3). As shown, the interactive image editing system 102 thus generates the output features 420 to pass to additional neural network layers utilizing the feature backpropagation refinement layer 414. In particular, the interactive image editing system 102 generates a scaled feature map from the biased feature map generated by the bias map 416. A scaled feature map refers to one or more features modified based on scale parameters of a convolutional sublayer. By utilizing the convolutional sublayer 418 together with the bias map 416, the interactive image editing system 102 increases the capacity of the digital image neural network to refine both global and local predictions (e.g., for not only channel-wise scale and bias but also combinations of features across different channels).

In some cases, a digital image neural network (e.g., the digital image neural network 304) includes multiple feature backpropagation refinement layers such as the feature backpropagation refinement layer 404 or 414 at different parts of the architecture. For instance, a digital image neural network includes a first feature backpropagation refinement layer earlier in the architecture for scaling and biasing more global, general features. In some cases, a digital image neural network also (or alternatively) includes a second feature backpropagation refinement layer later in the architecture for scaling and biasing more local, detailed features.

Moreover, although FIGS. 4A-4B illustrate a particular arrangement of bias sublayers and convolutional sublayers, the interactive image editing system 102 can utilize different arrangements or orders of these sublayers. For example, in some implementations, the interactive image editing system 102 uses a convolutional sublayer first and then applies a bias map.

Figure 5A:
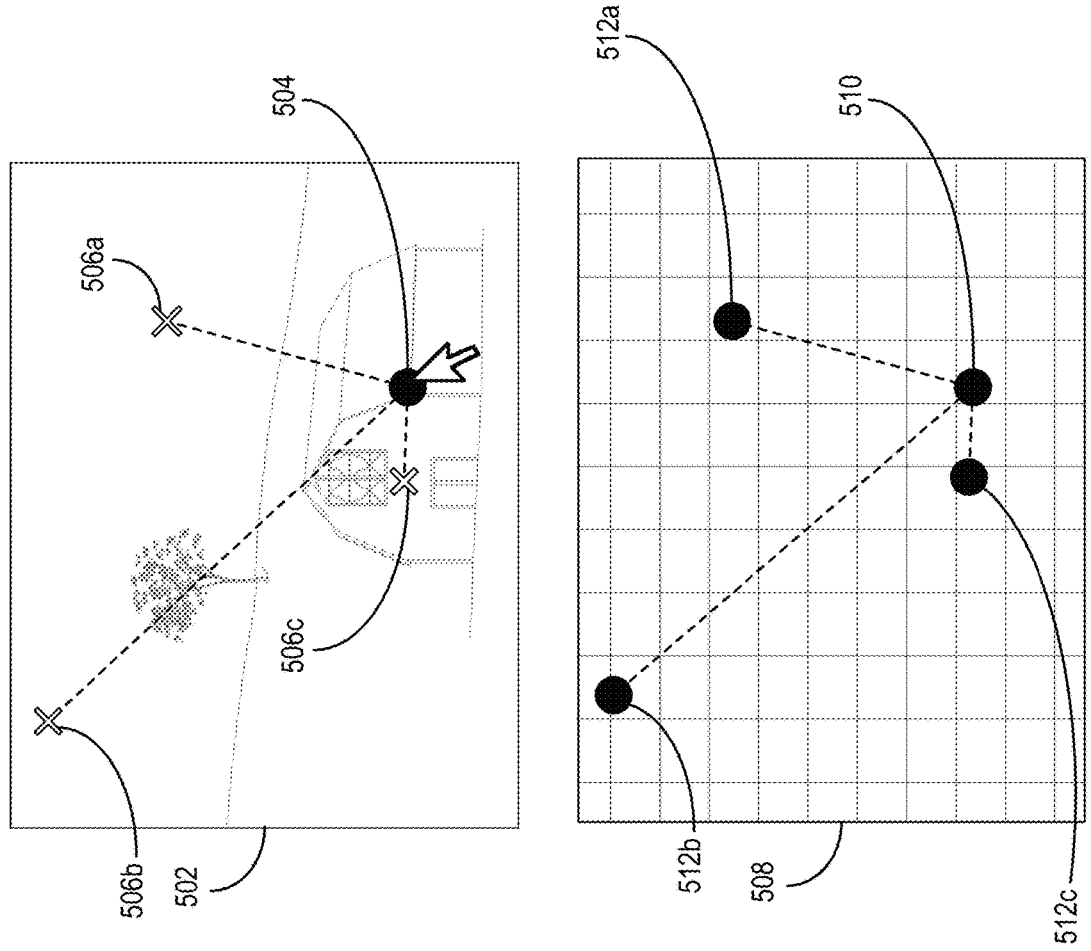

As mentioned, in one or more embodiments, the interactive image editing system 102 determines a consistency loss associated with a user interaction. In particular, the interactive image editing system 102 determines a consistency loss to punish or penalize changes made to pixels based on their respective distances from pixels or features directly selected from a user interaction (e.g., where changes to farther pixels or features are penalized more). FIGS. 5A-5B illustrate example depictions of determining a consistency loss in accordance with one or more embodiments.

As illustrated in FIG. 5A, the interactive image editing system 102 determines a consistency loss based on distances between pixels. More particularly, the interactive image editing system 102 identifies a pixel 504 (or a group of multiple pixels) indicated or selected by a user interaction with a digital image 502 (e.g., the modified digital image 316). In addition, the interactive image editing system 102 determines distances from the selected pixel 504 to other pixels within the digital image 502. For example, the interactive image editing system 102 determines a distance from the pixel 504 to a pixel 506a, determines another distance from the pixel 504 to the pixel 506b, and determines yet another distance from the pixel 504 to the pixel 506c.

In addition, the interactive image editing system applies a consistency loss function to penalize refinements made to the pixels 506a-c based on their respective distance from the pixel 504 (e.g., from the user interaction). For instance, the interactive image editing system 102 weights the pixels 506a-c to penalize refinements made to the pixels, where the pixel 506c is penalized the least (because it is closest to the pixel 504) and the pixel 506b is penalized the most (because it is farthest from the pixel 504). In some cases, the interactive image editing system 102 applies penalties only to refinements of pixels beyond a threshold distance from the pixel 504 (or from the user interaction) and refrains from penalizing pixels within the threshold distance. In these or other cases, the interactive image editing system 102 increases the magnitude or severity of penalties (e.g., proportionally) with increases in distance from the pixel 504 (or from the user interaction).

As also illustrated in FIG. 5A, the interactive image editing system 102 determines a consistency loss based on distances between features. Specifically, the interactive image editing system 102 determines a location of a feature 510 (or a group of features) indicated by a user interaction. For example, the interactive image editing system 102 determines the feature 510 as corresponding to, or representing, a pixel (e.g., the pixel 504) selected by a user interaction. In some cases, the interactive image editing system 102 identifies the feature 510 within a two-dimensional feature map 508 laying out locations of features extracted or generated via a bias map (e.g., the bias map 416) of a feature backpropagation refinement layer (e.g., the feature backpropagation refinement layer 414).

As shown, the interactive image editing system 102 further determines distances from the feature 510 to other features within the feature map 508. For instance, the interactive image editing system 102 determines, within the feature map 508, a distance from the feature 510 to the feature 512a (e.g., representing a particular pixel such as the pixel 506a), another distance from the feature 510 to the feature 512b (e.g., representing the pixel 506b), and yet another distance from the feature 510 to the feature 512c (e.g., representing the pixel 506c).

In addition, the interactive image editing system 102 applies a consistency loss function to penalize refinements of the features 512a-c based on their respective distance from the feature 510 (e.g., from the user interaction). For instance, the interactive image editing system 102 weights the features 512-c to penalize refinements made to the features, where the feature 512 is penalized the least (because it is closest to the feature 510) and the feature 512b is penalized the most (because it is farthest from the feature 510). In some cases, the interactive image editing system 102 applies penalties only to refinements of features beyond a threshold distance from the feature 510 (or from the user interaction) and refrains from penalizing features within the threshold distance. In some cases, the interactive image editing system 102 increases the magnitude or severity of penalties (e.g., proportionally) with increases in distance from the feature 510 (or from the user interaction).

In addition to a consistency loss, the interactive image editing system 102 can determine different losses specific to different image editing tasks. For example, the interactive image editing system 102 can determine a loss based on a segmentation classification. To illustrate, a negative segmentation user interaction can identify an incorrect segmentation pixel/region. In response, the interactive image editing system 102 can determine a loss that penalizes the segmentation of the selected pixel/region and/or encourages changing to a different segmentation. More specifically, the interactive image editing system 102 can determine a loss that encourages changing the segmentation of the selected pixel/region and can also determine a consistency loss that penalizes segmentation changes (i.e., encourages segmentation consistency) further away from the selected pixel/region.

The interactive image editing system 102 can accommodate a variety of different segmentation user interactions (e.g., boundary selections, positive segmentation selections, etc.) with different losses. To illustrate, the interactive image editing system 102 can receive two selections, a first interaction indicating a segmentation classification to copy and a second selection indicating a segmentation that needs to be changed to match. Similarly, the interactive image editing system 102 can receive two negative segmentation user interactions and determine a loss based on both negative segmentation user interactions.

As mentioned, in addition to consistency loss, the interactive image editing system 102 can determine a variety of other losses. For example, with regard to a depth map, the interactive image editing system 102 can receive depth user interactions indicating that a pixel/region should have a great or smaller depth. The interactive image editing system 102 can apply a loss to encourage increasing or decreasing the depth of the pixel/region and can apply a consistency loss that penalizes changes to pixels/regions further away from the depth user interaction.

Similarly, the interactive image editing system 102 can identify style transfer or hole-filling user interactions indicating a particular style to match or digital content to fill in a digital image. For example, the interactive image editing system 102 can receive a first user interaction identifying an initial style to copy and a second user interaction identifying a pixel/region to change. The interactive image editing system 102 can determine a measure of loss to encourage changing the pixel/region from the initial style to that of the copied style. The interactive image editing system 102 can utilize a consistency loss to penalize changes to pixels/regions further away from the user interaction. Similarly, the interactive image editing system 102 can receive a first user interaction identifying digital content to copy (either from the same digital image or a different digital image). The interactive image editing system 102 can receive a second user interaction identifying digital content to change. The interactive image editing system 102 can determine a measure of loss based on differences between the digital content to change and the digital content to copy (while also determining a consistency loss to penalize changes to other pixels/regions based on a distance from the user interaction).

In some cases, as illustrated in FIG. 5B, the interactive image editing system 102 utilizes a relationship loss based on multiple user interactions. For example, the interactive image editing system 102 determines a relationship loss based on a relationship between two or more user interactions (e.g., clicks) in addition to distances of pixels (or features) from the user interactions. As shown, the interactive image editing system 102 receives a first user interaction with the digital image 514 selecting a first pixel 516a (or a first group of pixels) and further receives a second user interaction with the digital image 514 selecting a second pixel 516b (or a second group of pixels).

As also shown, the interactive image editing system 102 determines, within a feature map 520, a first feature 522a associated with the first pixel 516a and a second feature 522b associated with the second pixel 516b. In some embodiments, the extracted features do not necessarily come from the same digital image. Indeed, as mentioned above with regard to digital content hole-filling, interactive image editing system 102 can extract digital content or features from other sources.

In addition, the interactive image editing system 102 further determines a relationship between the first user interaction (or the pixel 516a or the feature 522a) and the second user interaction (or the pixel 516b or the feature 522b). For example, the interactive image editing system 102 receives an indication (e.g., a user setting) of a relationship between the user interactions. In some cases, the interactive image editing system 102 determines or defines a relationship such that pixel values of pixels (or feature values of features) indicated by the first user interaction (e.g., the pixel 516a or the feature 522a) are to be replaced with pixels values of pixels (or feature values of features) indicated by the second user interaction (e.g., the pixel 516b or the feature 522b). In other cases, the interactive image editing system 102 determines a relationship to change pixel values (of feature values) associated with both pixel 516a and pixel 516b (or feature 522a and feature 522b) to be closer together (more similar) or farther apart (less similar).

In response to the first user interaction and/or the second user interaction, the interactive image editing system 102 determines a measure of loss to encourage changes to pixels at or near the selected pixels 516a and 516b. In addition, the interactive image editing system 102 determines a consistency loss to discourage changes farther from the selected pixels 516a and 516b. Indeed, the interactive image editing system 102 determines a consistency loss based on distances relative to other pixels of the digital image 514 and/or relative to other features of the feature map 520 (e.g., a feature map extracted from the digital image 514). For example, the interactive image editing system 102 determines a distance of the pixel 518a from the pixel 516a (or from the first user interaction) and determines a distance of the pixel 518b from the pixel 516a (or from the first user interaction).

In addition, the interactive image editing system 102 determines a distance of the pixel 518a from the pixel 516b (or from the second user interaction) and determines a distance of the pixel 518b from the pixel 516b (or from the second user interaction). The interactive image editing system 102 thus determines a relationship loss based on a difference between the pixels/regions selected by the user and a desired change (e.g., an incorrect segmentation, an incurred depth, a different style, new digital content to fill) and then localizes the change by using a consistency loss to penalize refinement of digital images further away from the user interaction(s).

In some embodiments, as part of determining a consistency loss, the interactive image editing system 102 determines a distance, within the feature map 520, of the feature 524a from the feature 522a (or from the first user interaction) and further determines a distance of the feature 524b from the feature 522a (or from the first user interaction). In addition, the interactive image editing system 102 determines a distance of the feature 524a from the feature 522b (or from the second user interaction) and further determines a distance of the feature 524b from the feature 522b (or from the second user interaction).

As described above, by using a consistency loss, the interactive image editing system 102 penalizes changes or refinements to pixels or features based on their distances relative to selected pixels or features. For example, the interactive image editing system 102 weights pixels or features to penalize refinements made relative to pixels or features farther from the pixels 516a and 516b or the features 522a and 522b. Specifically, based on a particular relationship between the pixels 516a and 516b (or between the features 522a and 522b), the interactive image editing system 102 applies penalties to reduce the likelihood of selecting pixel values (or feature values) farther from the pixel 516b (or the feature 522b) for replacing pixel values (or feature values) associated with the pixel 516a (or the feature 522a). Similarly, the interactive image editing system 102 applies weights or penalties to reduce the likelihood of replacing pixels (or features) farther from the pixel 516a (or the feature 522a) with other pixels (or features). Thus, based on a relationship loss indicating the relationship indicated by one or more user interactions as well as a consistency loss based on the distances to other pixels (or features), the interactive image editing system 102 replaces pixel values near the pixel 516a (or feature values near the feature 522a) with pixel values near the pixel 516b (or feature values near the feature 522b).

As mentioned above, based on another relationship, the interactive image editing system 102 penalizes changes to reduce a likelihood of modifying pixels in other ways. For instance, the interactive image editing system 102 determines a relationship loss to move pixel values associated with the pixel 516a (or feature values associated with the feature 522a) and pixel values associated with the pixel 516b (or feature values associated with the feature 522b) to be closer together (or farther apart). In turn, the interactive image editing system 102 applies consistency loss penalties to ensure that no changes are made to farther pixels (or features) and that only pixels (or features) near (e.g., within a threshold distance) the pixel 516a and/or the pixel 516b (or the feature 522a and/or the feature 522b) are refined or modified.

As mentioned previously, in some embodiments, the interactive image editing system 102 determines other types of loss. For example, the interactive image editing system 102 receives additional user interactions (e.g., three or more) and determines relationships between the user interactions. For instance, the interactive image editing system 102 determines a relationship loss where a pixel (or feature) corresponding to a first user interaction is to be less like a pixel (or feature) corresponding to a second user interaction and more like a pixel (or feature) corresponding to a third user interaction. In other embodiments, the interactive image editing system 102 determines relationship loss based on a single user interaction to indicate only incorrect pixels (or features) without an indication of how to correct the pixels (or features). In still other embodiments, the interactive image editing system 102 determines a loss based on a first user interaction to indicate one or more incorrect pixels and to further indicate increasing, decreasing, or changing pixel values (or feature values) in some other specified way.

In one or more embodiments, the interactive image editing system 102 combines losses together into a combined loss or a total loss. For example, the interactive image editing system 102 determines a relationship loss, a consistency loss, and/or other losses as part of modifying the pixels of a digital image. As described herein, the interactive image editing system 102 utilizes some losses (e.g., L1 losses, L2 losses, etc.) to encourage changes to pixels near user interactions, utilizes a consistency loss to discourage changes farther from user interactions. In certain cases, the interactive image editing system 102 combines the losses together (e.g., adding the losses together) into an overall loss.

In some embodiments, the interactive image editing system 102 performs a step for generating modified parameters for the feature backpropagation refinement layer. The above description of acts 208-212 of FIG. 2, including the more detailed descriptions in support of acts 208-212 provided in relation to FIGS. 3A-5B, provide various embodiments and supporting acts and algorithms for performing a step for generating modified parameters for the feature backpropagation refinement layer.

For example, in some embodiments, performing a step for generating modified parameters for the feature backpropagation refinement layer includes receiving a user interaction and backpropagating to modify parameters of a feature backpropagation refinement layer in response to the user interaction (e.g., as described in relation to FIGS. 3A-3B). In some embodiments, performing a step for generating modified parameters for the feature backpropagation refinement layer also includes determining a consistency loss (e.g., as described in relation to FIGS. 5A-5B) and backpropagating to reduce the consistency loss by modifying parameters of the feature backpropagation refinement layer.

Figure 6A:
FIGS. 6A-6C illustrate an example of generating a refined digital image in the form of a segmentation digital image in accordance with one or more embodiments.
Figure 6B:
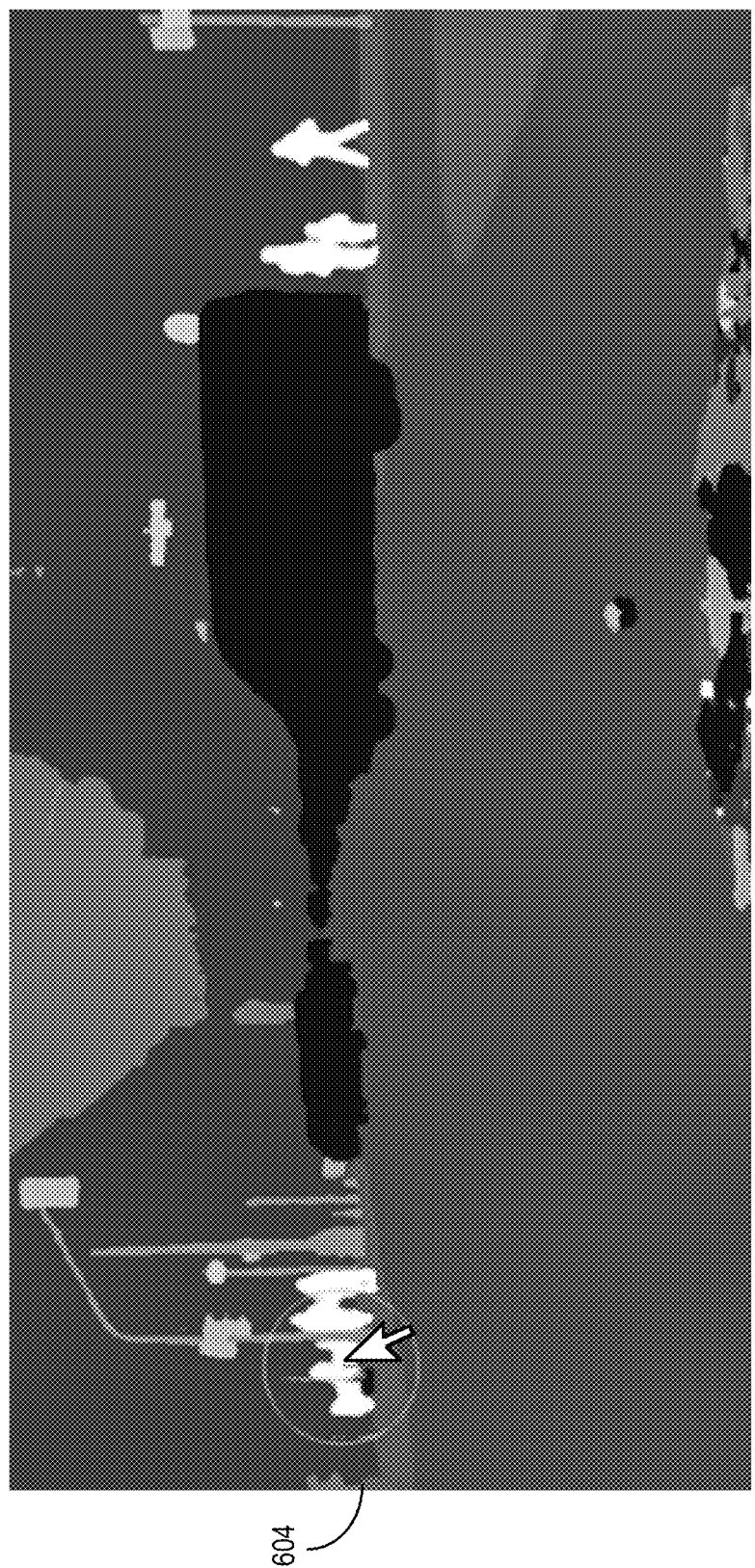
Figure 6C:
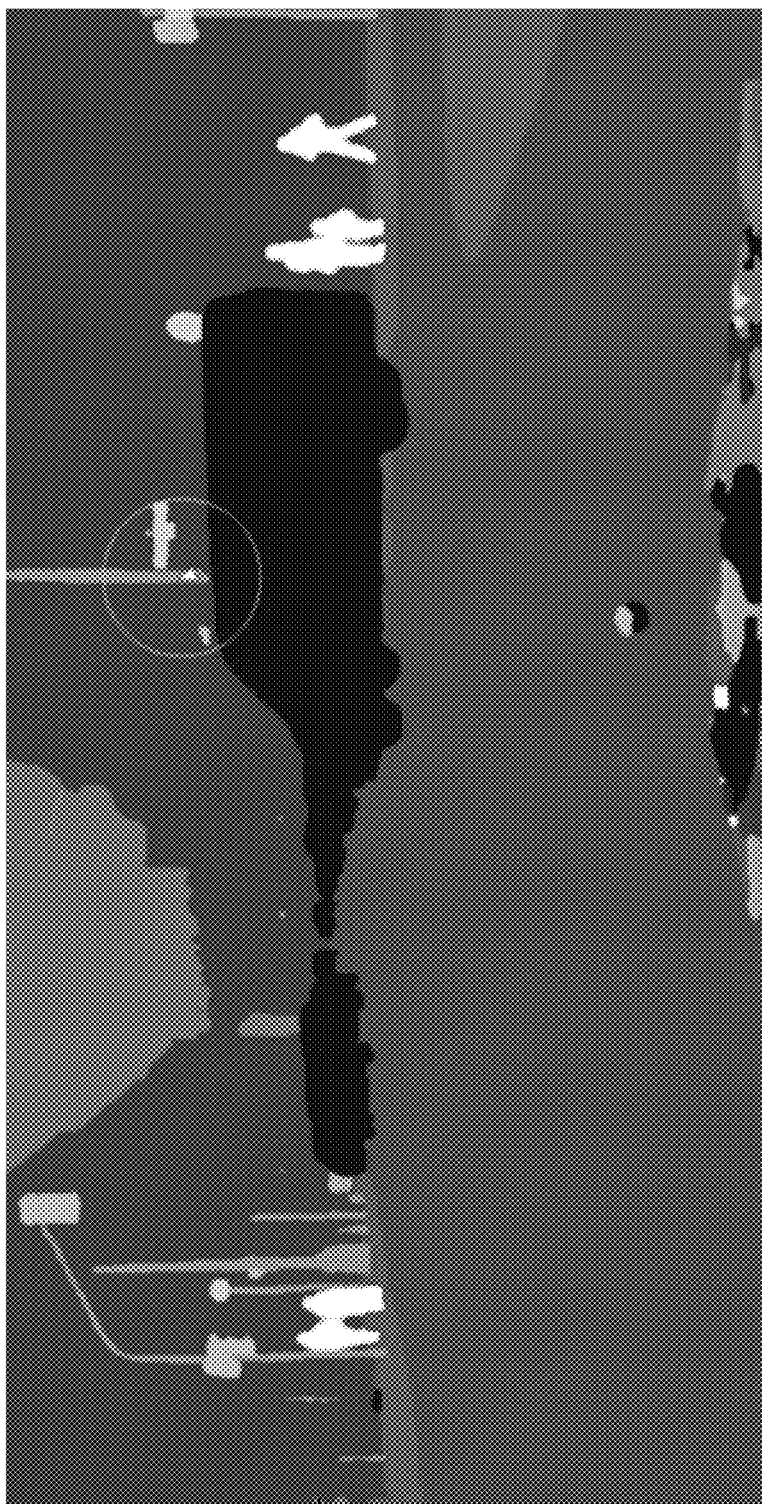
Figure 7A:
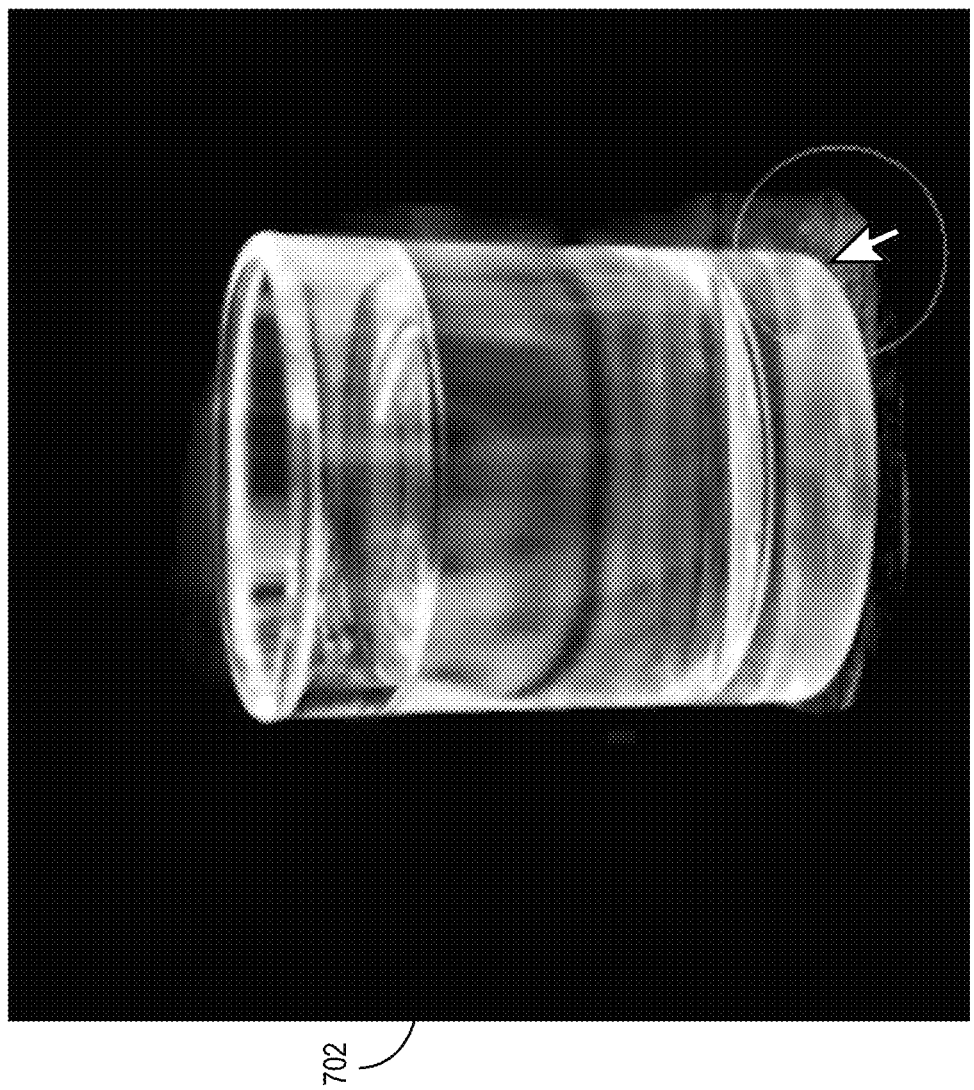
FIGS. 7A-7B illustrate an example of generating a refined digital image in the form of a digital image matte in accordance with one or more embodiments.
Figure 7B:
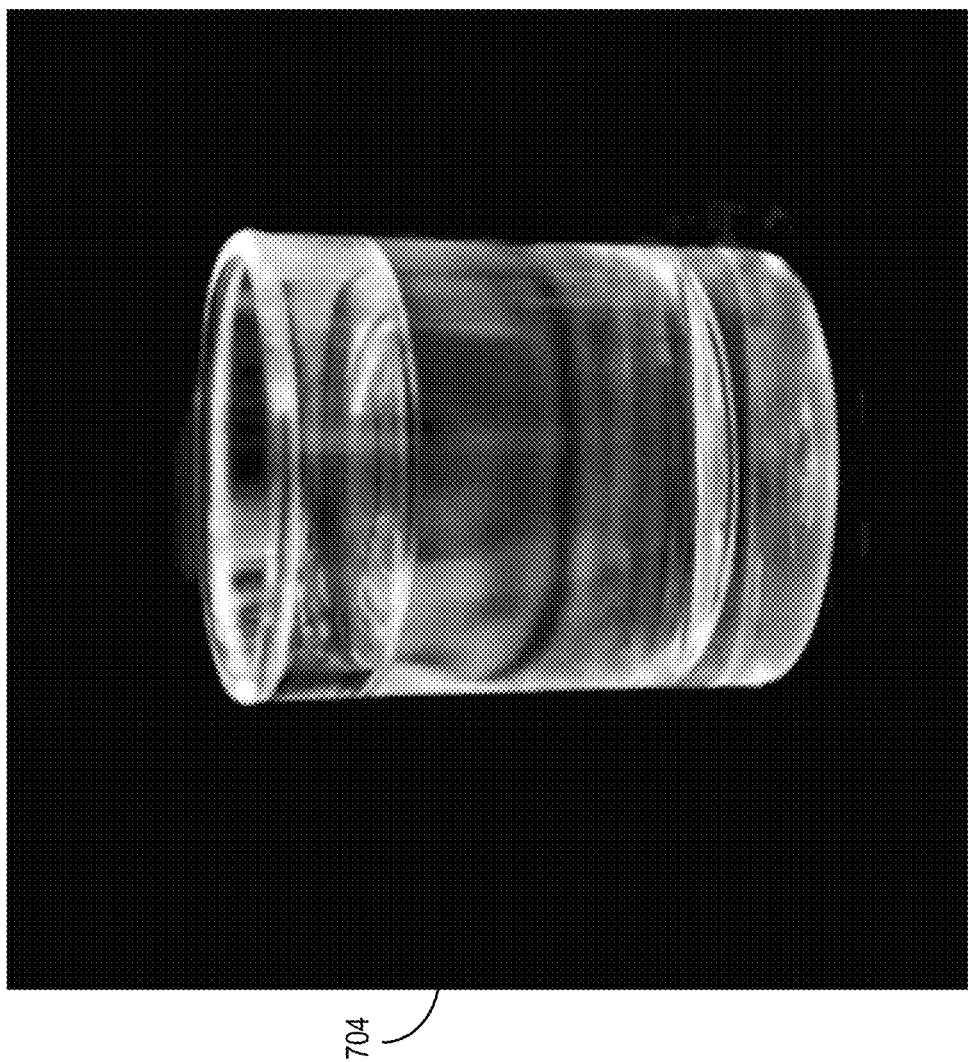
Figure 8A:
FIGS. 8A-8C illustrate an example of generating a refined digital image in the form of a digital image depth map in accordance with one or more embodiments.
Figure 8B:
Figure 8C:

As mentioned above, in certain embodiments, the interactive image editing system 102 generates refined digital images of various types utilizing a feature backpropagation refinement layer. In particular, the interactive image editing system 102 utilizes a feature backpropagation refinement layer as part of a digital image neural network to generate refined digital images based on modified parameters of a bias sublayer and a convolutional sublayer. FIGS. 6A-6C illustrate generating a refined digital image in the form of a segmentation digital image in accordance with one or more embodiments. Thereafter, FIGS. 7A-7B illustrate generating a refined digital image in the form of a digital image matte in accordance with one or more embodiments. Further, FIGS. 8A-8C illustrate generating a refined digital image in the form of a digital image depth map in accordance with one or more embodiments.

As illustrated in FIG. 6A, the interactive image editing system 102 receives or accesses an initial digital image 602. As shown, the initial digital image 602 depicts a city scene from the view of a car or trolley traveling down a street. The digital image 602 depicts various types of objects belonging to different semantic classes or categories, including cars, buildings, road, and people, light posts.

As illustrated in FIG. 6B, the interactive image editing system 102 generates a modified digital image 604. In particular, the interactive image editing system 102 generates the modified digital image 604 from the digital image 602 utilizing a digital image neural network. For example, the interactive image editing system 102 utilizes a particular digital image neural network that includes one or more feature backpropagation refinement layers at certain locations in the architecture. In some embodiments, the interactive image editing system 102 utilizes a digital image neural network for generating segmentation digital images, as described by Andrew Tao, Karan Sapra, and Bryan Catanzaro in Hierarchical Multi-Scale Attention for Semantic Segmentation, arXiv:2005.1082 (2020). In other embodiments, the interactive image editing system 102 utilizes a digital image neural network for segmenting digital images having a different architecture.

For instance, the interactive image editing system 102 utilizes the digital image neural network including three feature backpropagation refinement layers at specified scales at the end of the backbone of the neural network before multi-scale features are scaled and concatenated. Specifically, the interactive image editing system 102 utilizes feature backpropagation refinement layers with the following dimensions: number of channels=[96, 192, 384], H=[img_h/8, img_h/16, img_h/32], and W=[img_w/8, img_w/16, img_w/32] where H represents height, W represents width, img_h represents image height, and img_w represents image width.

As shown, the modified digital image 604 is a panoptic segmentation digital image depicting an initial prediction of different semantic segmentations for objects depicted within the digital image 602. Indeed, the interactive image editing system 102 generates the modified digital image 604 utilizing learned parameters of various neural network layers and unlearned (e.g., initialization) parameters of the feature backpropagation refinement layers (prior to user interaction with the modified digital image 604). In addition, the interactive image editing system 102 receives or detects a user interaction with the modified digital image 604. As shown, the interactive image editing system 102 receives a selection of pixels that are incorrectly labeled as people. In some cases, the interactive image editing system 102 receives a second user interaction with the modified digital image 604 selecting pixels incorrectly segmented as non-light-post pixels above the van (where the pixels actually depict a light post). The interactive image editing system 102 can identify a user interaction identifying an incorrect segmentation, a user interaction identifying a replacement segmentation class, and/or two interactions identifying matching segmentation classes.

As illustrated in FIG. 6C, in response to receiving the user interaction(s), the interactive image editing system 102 generates a refined digital image 606. In particular, the interactive image editing system 102 generates the refined digital image 606 from features extracted from the digital image 602 and in response to the user interaction with the modified digital image 604. For example, the interactive image editing system 102 generates the refined digital image 606 by, in response to the user interaction, determining a consistency loss associated with the user interaction, backpropagating to modify parameters of the feature backpropagation refinement layer (e.g., to reduce the consistency loss), and utilizing the modified parameters to refine features extracted from the digital image 602. As shown, the refined digital image 606 depicts corrected pixels for the light post and the people. Indeed, compared to the modified digital image 604, the refined digital image 606 reclassifies pixels previously indicated as people (e.g., to building pixels) and reclassifies pixels previously indicated as building pixels to light post pixels.

As mentioned above, in some embodiments, the interactive image editing system 102 generates a refined digital image in the form of a digital image matte. FIG. 7A illustrates a modified digital image 702 in the form of a digital image matte in accordance with one or more embodiments. As shown, the modified digital image 702 depicts a glass of water with some pixels around the glass that are incorrectly matted. To generate the modified digital image 702, the interactive image editing system 102 utilizes a digital image neural network such as IndexNet (or some other neural network architecture) modified to include a feature backpropagation refinement layer with particular dimensions (e.g., number of channels=64, H=img_h/8, W=image_w/8) in the skip connections. Indeed, the interactive image editing system 102 generates the modified digital image 702 utilizing learned parameters of one or more neural network layers and unlearned parameters of the feature backpropagation refinement layer.

As further shown, the interactive image editing system 102 receives a user interaction indicating one or more pixels of the modified digital image 702. For example, the interactive image editing system 102 can identify a user interaction identifying an incorrect matting pixel/region, a user interaction identifying a replacement matting classification (e.g., replace a current pixel matting prediction with a foreground, background, or alpha value), and/or two interactions identifying matching pixels. In response to the user interaction, the interactive image editing system 102 determines a consistency loss and backpropagates to modify parameters of the feature backpropagation refinement layer to reduce the consistency loss as described herein. As illustrated in FIG. 7B, utilizing the modified parameters of the feature backpropagation refinement layer, the interactive image editing system 102 generates a refined digital image 704. Indeed, the interactive image editing system 102 generates the refined digital image 704 to correct or fix the pixels indicated by the user interaction. As shown, the refined digital image 704 is a digital image matte that depicts corrected pixels around the glass of water.

As further mentioned above, in certain embodiments, the interactive image editing system 102 generates a refined digital image in the form of a digital image depth map. FIGS. 8A-8C illustrate generating a digital image depth map in accordance with one or more embodiments. As illustrated in FIG. 8A, the interactive image editing system 102 receives or accesses an initial digital image 802. In particular, the initial digital image 802 depicts a bathroom with a shower, a toilet, and a tub, all at different depths relative to the camera capturing the image.

As illustrated in FIG. 8B, the interactive image editing system 102 generates a modified digital image 804 from the digital image 802. In particular, the interactive image editing system 102 generates the modified digital image 804 utilizing a digital image neural network modified to include a feature backpropagation refinement layer with unlearned parameters. For example, the interactive image editing system 102 utilizes a digital image neural network as described by Jin Han Lee, Myung-Kyu Han, Dong Wook Ko, and Il Hong Suh in *From Big to Small: Multi-Scale Local Planar Guidance for Monocular Depth Estimation*, arXiv: 1907.10326v5 (2020), where the digital image neural network is modified to include one or more feature backpropagation refinement layers.

For instance, the digital image neural network includes a single feature backpropagation refinement layer with particular dimensions (e.g., number of channels=256, H=img_h/32, and W=img_w/32) at the beginning feature for the decoder. In certain cases, the interactive image editing system 102 selects the top 256 channels with the highest absolute activations from the 1024 total channels of the neural network. In some embodiments, the interactive image editing system 102 utilizes a neural network with a different architecture. As shown, the modified digital image 804 depicts a depth map indicating different depths of objects depicted within the digital image 802. As further shown, the interactive image editing system 102 receives a user interaction indicating one or more pixels of the modified digital image 804.

As illustrated in FIG. 8C, the interactive image editing system 102 generates a refined digital image 806 from features extracted from the digital image 802 in response to the user interaction with the modified digital image 804. For example, the interactive image editing system 102 identifies a user interaction indicating two matching depths, a user interaction indicating an edge (or two sides of an edge), a user interaction indicating a need to increase the depth, or a user interaction indicating a need to decrease the depth. The interactive image editing system 102 generates the refined digital image 806 by backpropagating to modify parameters of the feature backpropagation refinement layer and updating features extracted from the digital image 802 according to the modified parameters. Indeed, the interactive image editing system 102 utilizes the digital image neural network to generate the refined digital image 806 which depicts corrections to pixels of the modified digital image 804. As shown, the refined digital image 806 shows clearer edges of objects delineating depth changes as compared to the modified digital image 804.

In certain described embodiments, the interactive image editing system 102 improves digital image predictions based on user interactions indicating pixels that are incorrectly predicted initially. Experimenters have demonstrated the improvements of the interactive image editing system 102 in several use cases, including semantic segmentation, image matting, and depth mapping. For example, FIGS. 9A-9C illustrate graphs depicting the accuracy improvements of the interactive image editing system 102 in response to user interactions (e.g., clicks).

Figure 9A:
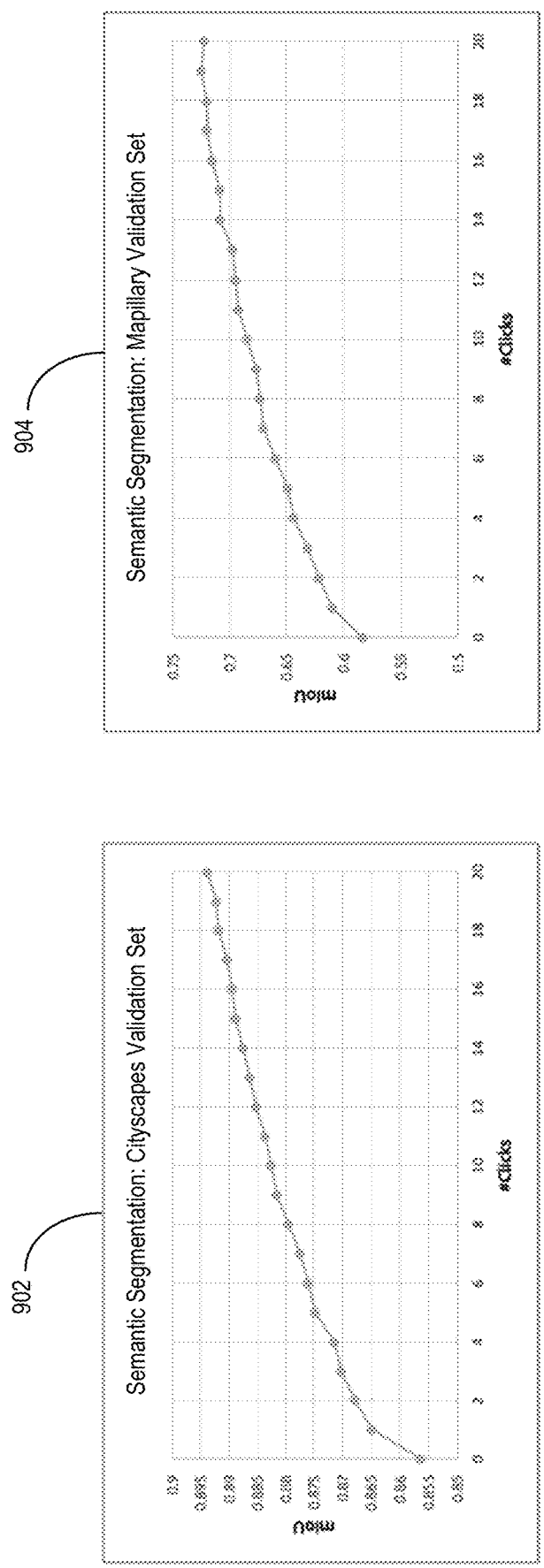
FIGS. 9A-9C illustrate example graphs of experimental results for the interactive image editing system in accordance with one or more embodiments.

As illustrated in FIG. 9A, the graph 902 and the graph 904 each depict results for semantic segmentation. Indeed, the graphs 902 and 904 illustrate comparisons between a number of clicks received from a client device and a mean intersection over union (mIoU) measure that represents a pixel accuracy in a generated prediction (e.g., a refined digital image). As shown, in the graph 902 illustrates results measured over the Cityscapes validation dataset, and the graph 904 illustrates results measured over the Mapillary validation dataset. In each case, as the number of clicks increases (e.g., indicating one or more pixels to correct within a modified digital image), the measure of mIoU also increases, demonstrating the improved accuracy of the neural network that results from modifying parameters of the feature backpropagation refinement layer in response to user interactions.

Figure 9B:
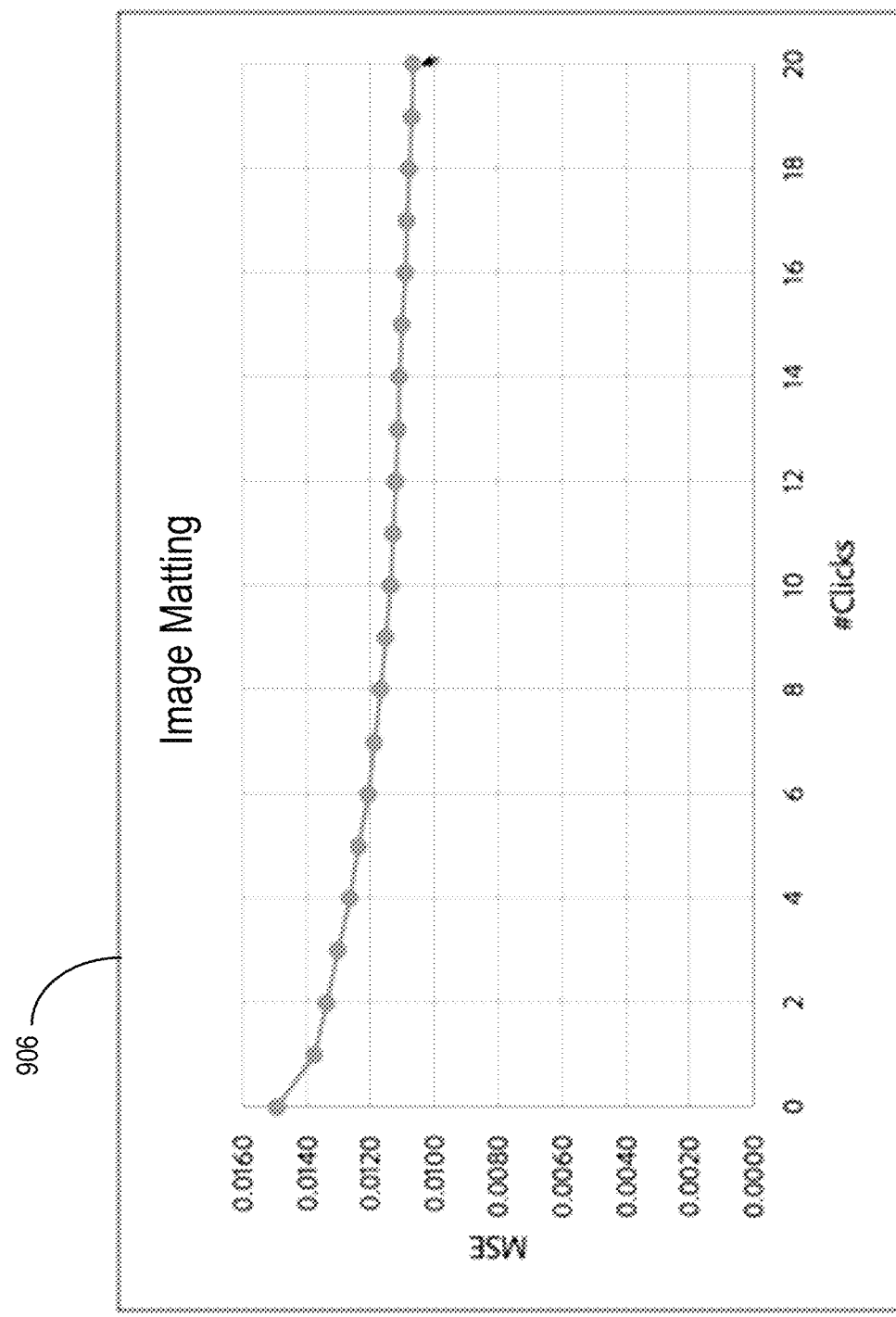

As illustrated in FIG. 9B, the graph 906 depicts experimental results for image matting. As shown, the interactive image editing system 102 improves the accuracy of digital images generated for image matting based on user interactions. The graph 906 depicts a comparison between numbers of clicks and mean squared error (MSE), where the MSE decreases as the number of clicks increases. Indeed, as the interactive image editing system 102 receives user interactions indicating pixels to correct, the digital image neural network generates more accurate digital images utilizing modified parameters of a feature backpropagation refinement layer.

Figure 9C:
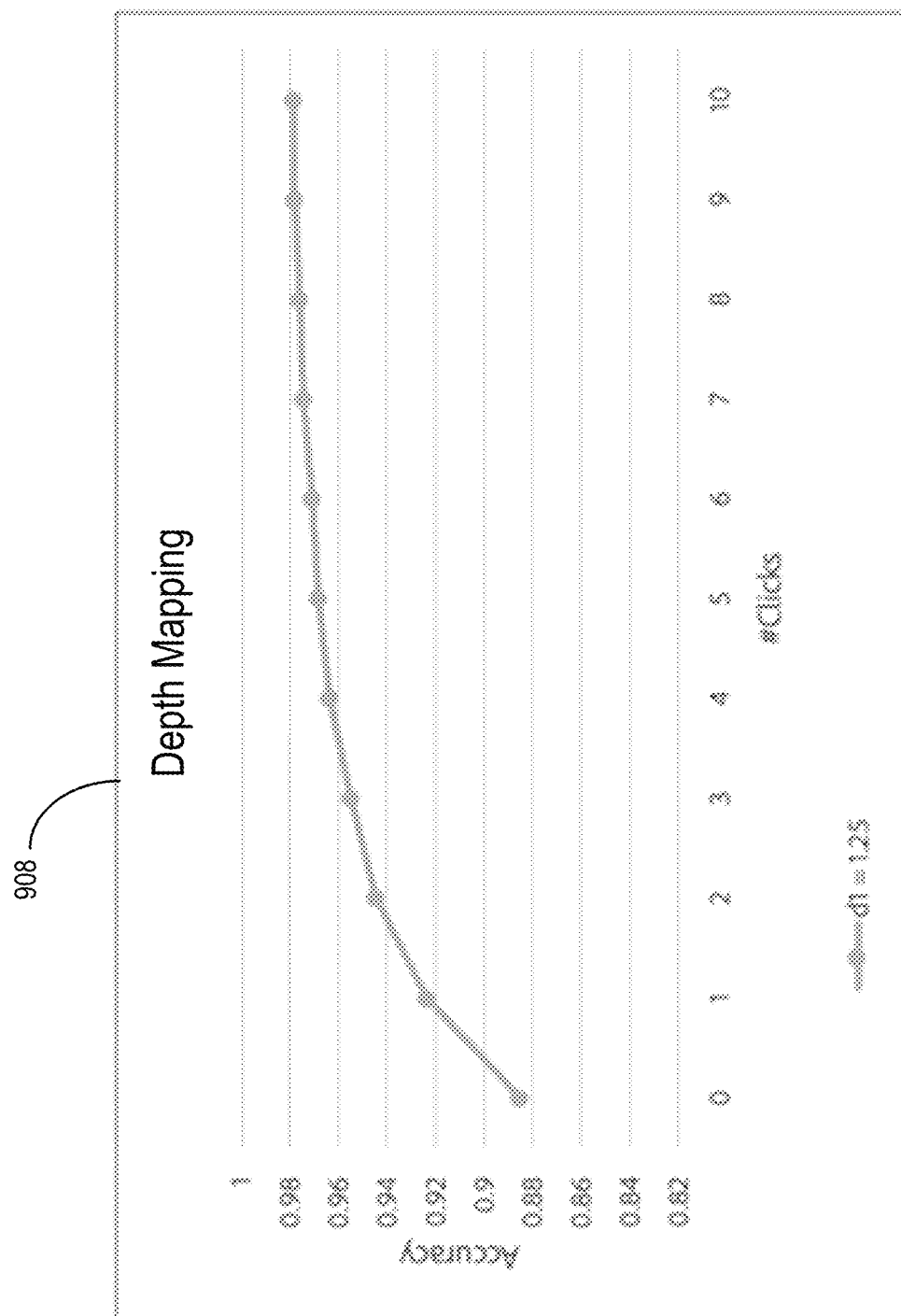

As illustrated in FIG. 9C, the graph 908 depicts experimental results for depth mapping. As shown, the interactive image editing system 102 improves the accuracy of the neural network in generating digital image depth maps based on user interactions. The graph 908 depicts such improvements in accuracy, where the accuracy measure of the Y axis increases as the number of clicks increases along the X axis. Indeed, as the interactive image editing system 102 receives user interactions indicating pixels to correct, the digital image neural network generates more accurate digital images utilizing modified parameters of a feature backpropagation refinement layer.

Figure 10:
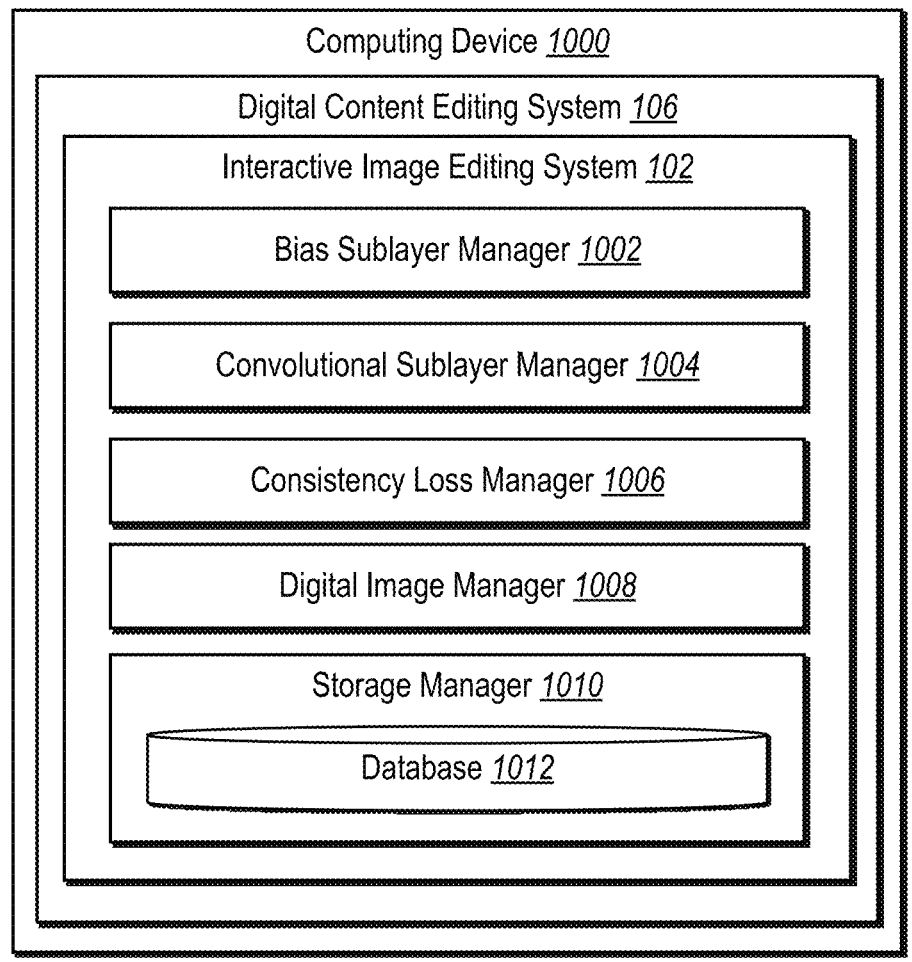
FIG. 10 illustrates a schematic diagram of an interactive image editing system in accordance with one or more embodiments.

Looking now to FIG. 10, additional detail will be provided regarding components and capabilities of the interactive image editing system 102. Specifically, FIG. 10 illustrates an example schematic diagram of the interactive image editing system 102 on an example computing device 1000 (e.g., one or more of the client device 108 and/or the server(s) 104). As shown in FIG. 10, the interactive image editing system 102 includes a bias sublayer manager 1002, a convolutional sublayer manager 1004, a consistency loss manager 1006, a digital image manager 1008, and a storage manager 1010.

As just mentioned, the interactive image editing system 102 includes a bias sublayer manager 1002. In particular, the bias sublayer manager 1002 manages, maintains, modifies, trains, implements, updates, utilizes, or applies a bias sublayer as part of a feature backpropagation refinement layer of a digital image neural network. For example, the bias sublayer manager 1002 updates bias parameters of a bias sublayer in response to user interaction to, in some cases, reduce a measure of consistency loss. In one or more embodiments, the bias sublayer manager 1002 generates a feature map from features extracted from an initial digital image utilizing parameters updated via backpropagation in response to user interaction.

In addition, the interactive image editing system 102 includes a convolutional sublayer manager 1004. In particular, the convolutional sublayer manager 1004 manages, maintains, modifies, trains, implements, updates, utilizes, or applies a convolutional sublayer as part of a feature backpropagation layer of a digital image neural network. For example, the convolutional sublayer manager 1004 modifies or updates scale parameters of a convolutional sublayer in response to user interaction selecting one or more pixels. In some cases, the convolutional sublayer manager 1004 processes features extracted from a digital image and/or from a feature map of a bias sublayer to generate output features to pass to additional layer of a digital image neural network (e.g., to generate a refined digital image).

As further illustrated in FIG. 10, the interactive image editing system 102 includes a consistency loss manager 1006. In particular, the consistency loss manager 1006 manages, maintains, determines, generates, identifies, reduces, modifies, or obtains a measure of consistency loss. For example, the consistency loss manager 1006 determines a consistency loss based on distances from selected pixels and/or features to other pixels and/or features associated with a digital image. In some cases, the consistency loss manager 1006 determines a consistency loss to penalize changes farther from selected pixels and/or selected features so that only pixels and/or features closer to a user interaction are modified in response to the user interaction. The consistency loss manager 1006 can determine different types of consistency losses based on different numbers of user interactions and/or relationships between user interactions. The consistency loss manager 1006 further communicates with the bias sublayer manager 1002 and/or the convolutional sublayer manager 1004 to modify parameters to reduce the consistency loss and generate new features.

Additionally, the interactive image editing system 102 includes a digital image manager 1008. In particular, the digital image manager 1008 receives, accesses, generates, determines, modifies, updates, refines, or identifies digital images. For example, the digital image manager 1008 utilizes one or more layers of a digital image neural network to extract features from a digital image to pass to a feature backpropagation refinement layer including a bias sublayer and a convolutional sublayer. The digital image manager 1008 also passes modified features from the feature backpropagation refinement layer to additional neural network layers to generate a modified digital image or a refined digital image. In response to modifying parameters of a feature backpropagation refinement layer, the digital image manager 1008 can generate a refined digital image of a particular type, such as a segmentation digital image, a digital image depth map, a digital image matte, an inpainted digital image, or a stylized digital image.

The interactive image editing system 102 further includes a storage manager 1010. The storage manager 1010 operates in conjunction with, or includes, one or more memory devices such as the database 1012 (e.g., the database 112) that store various data such as one or more digital images, modified digital images, refined digital images, and/or a digital image neural network including a feature backpropagation refinement layer.

In one or more embodiments, each of the components of the interactive image editing system 102 are in communication with one another using any suitable communication technologies. Additionally, the components of the interactive image editing system 102 is in communication with one or more other devices including one or more client devices described above. It will be recognized that although the components of the interactive image editing system 102 are shown to be separate in FIG. 10, any of the subcomponents may be combined into fewer components, such as into a single component, or divided into more components as may serve a particular implementation. Furthermore, although the components of FIG. 10 are described in connection with the interactive image editing system 102, at least some of the components for performing operations in conjunction with the interactive image editing system 102 described herein may be implemented on other devices within the environment.

The components of the interactive image editing system 102 can include software, hardware, or both. For example, the components of the interactive image editing system 102 can include one or more instructions stored on a computer-readable storage medium and executable by processors of one or more computing devices (e.g., the computing device 1000). When executed by the one or more processors, the computer-executable instructions of the interactive image editing system 102 can cause the computing device 1000 to perform the methods described herein. Alternatively, the components of the interactive image editing system 102 can comprise hardware, such as a special purpose processing device to perform a certain function or group of functions. Additionally, or alternatively, the components of the interactive image editing system 102 can include a combination of computer-executable instructions and hardware.

Furthermore, the components of the interactive image editing system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the interactive image editing system 102 may be implemented as part of a stand-alone application on a personal computing device or a mobile device. Alternatively, or additionally, the components of the interactive image editing system 102 may be implemented in any application that allows creation and delivery of marketing content to users, including, but not limited to, applications in ADOBE® EXPERIENCE MANAGER and CREATIVE CLOUD®, such as PHOTOSHOP®, LIGHTROOM®, and INDESIGN®. "ADOBE," "ADOBE EXPERIENCE MANAGER," "CREATIVE CLOUD," "PHOTOSHOP," "LIGHTROOM," and "INDESIGN" are either registered trademarks or trademarks of Adobe Inc. in the United States and/or other countries.

FIGS. 1-10 the corresponding text, and the examples provide a number of different systems, methods, and non-transitory computer readable media for generating a refined digital image utilizing a digital image neural network that includes a feature backpropagation refinement layer and/or a consistency loss. In addition to the foregoing, embodiments can also be described in terms of flowcharts comprising acts for accomplishing a particular result. For example, FIG. 11 illustrates a flowchart of an example sequence or series of acts in accordance with one or more embodiments.

Figure 11:
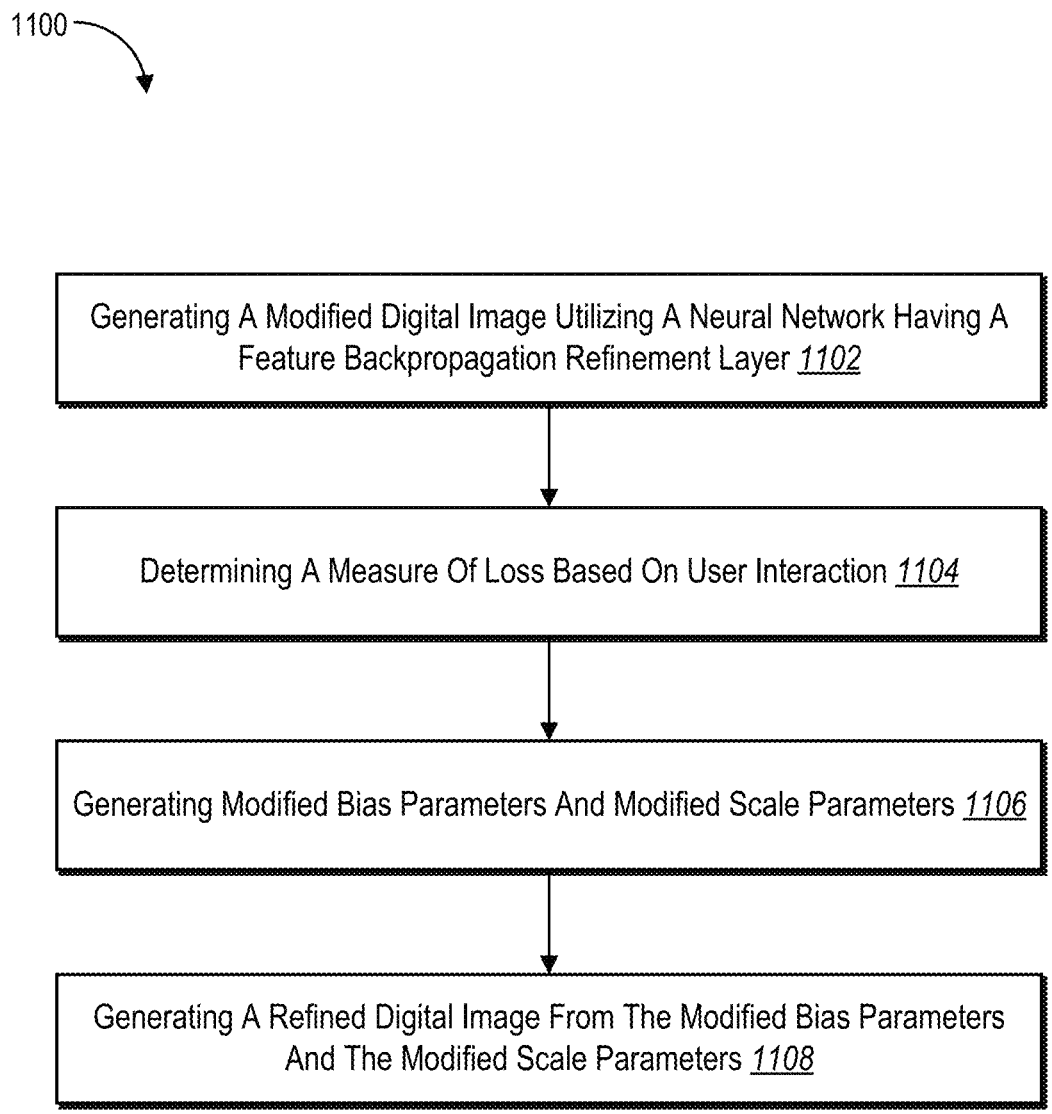
FIG. 11 illustrates a flowchart of a series of acts for generating a refined digital image utilizing a digital image neural network that includes a feature backpropagation refinement layer and/or a consistency loss in accordance with one or more embodiments.

While FIG. 11 illustrates acts according to particular embodiments, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 for generating a refined digital image utilizing a digital image neural network that includes a feature backpropagation refinement layer and/or a consistency loss. In particular, the series of acts 1100 includes an act 1102 of generating a modified digital image utilizing a neural network having a feature backpropagation refinement layer. For example, the act 1102 involves generating a modified digital image from a digital image utilizing a digital image neural network comprising neural network layers having learned parameters and a feature backpropagation refinement layer comprising a two-dimensional bias map having unlearned bias parameters and a convolutional sublayer having unlearned scale parameters. In some cases, the act 1102 involves utilizing the digital image neural network comprising the neural network layers having the learned parameters determined without utilizing sample user interactions during training for the digital image neural network.

In some embodiments, the act 1102 involves generating a modified digital image from the digital image utilizing the learned parameters of the plurality of neural network layers. In certain cases, the act 1102 involves utilizing the feature backpropagation refinement layer comprising a convolutional sublayer having a first dimension corresponding to a number of feature channels extracted via the plurality of neural network layers and having a second dimension corresponding to a dimension of the digital image. In some embodiments, the act 1102 involves utilizing the learned parameters of the plurality of neural network layers together with unlearned bias parameters of a bias sublayer within the feature backpropagation refinement layer and unlearned scale parameters of a convolutional sublayer within the feature backpropagation refinement layer. In one or more embodiments, the act 1102 involves generating the modified digital image utilizing the plurality of neural network layers and the feature backpropagation refinement layer comprising a plurality of two-dimensional bias maps. The act 1102 can include utilizing the learned parameters of the plurality of neural network layers learned without utilizing sample user interactions.

As shown, the series of acts 1100 also includes an act 1104 of determining a measure of loss based on user interaction. In particular, the act 1104 involves determining a measure of loss based on a user interaction with one or more pixels of the modified digital image. For example, the act 1104 involves determining distances from the one or more pixels of the user interaction to other pixels within the modified digital image and penalizing, according to the distances from the one or more pixels of the user interaction, refinement of pixels of the modified digital farther from the user interaction. In some cases, the act 1104 involves, in response to a user interaction with one or more pixels of the modified digital image, determining a consistency loss based on distances from the user interaction.

In some embodiments, the act 1106 involves determining, within a feature map, distances between one or more features corresponding to the one or more pixels of the user interaction and features corresponding to other pixels of the modified digital image. Additionally, the act 1106 involves penalizing refinement of a first feature in the feature map utilizing a first penalty according to a first distance of the first feature from the one or more features corresponding to the one or more pixels. Further, the act 1106 involves penalizing refinement of a second feature in the feature space utilizing a second penalty larger than the first penalty according to a second distance, larger than the first distance, of the second feature from the one or more features corresponding to the one or more pixels.

As also shown, the series of acts 1100 includes an act 1106 of generating modified parameters such as modified bias parameters and modified scale parameters. In particular, the act 1106 involves generating, utilizing the measure of loss, modified bias parameters of the two-dimensional bias map and modified scale parameters of the convolutional sublayer. For example, the act 1106 involves backpropagating within the digital image neural network to modify the unlearned bias parameters and the unlearned scale parameters to reduce the measure of loss determined based on the user interaction. In some cases, the act 1106 involves generating modified parameters of the feature backpropagation refinement layer utilizing the consistency loss. In one or more embodiments, the act 1106 involves generating modified parameters of the feature backpropagation refinement layer comprising a bias sublayer and a convolutional sublayer by generating modified bias parameters for the bias sublayer and modified scale parameters for the convolutional sublayer according to the consistency loss. The act 1106 can also involve generating the modified bias parameters for the bias sublayer comprising a bias map having dimensions corresponding to dimensions of the digital image or dimensions of a feature map representing the digital image.

Further, the series of acts 1100 includes an act 1108 of generating a refined digital image from the modified bias parameters and the modified scale parameters. In particular, the act 1108 involves generating a refined digital image from the digital image utilizing one or more of the learned parameters of the neural network layers and the modified parameters of the feature backpropagation refinement layer (e.g., the modified bias parameters of the two-dimensional bias map, and the modified scale parameters of the convolutional sublayer). For example, the act 1108 involves updating the one or more pixels of the user interaction and updating one or more additional pixels of the modified digital image in response to the user interaction according to the modified bias parameters and the modified scale parameters.

In some cases, the act 1108 involves extracting a set of features from the digital image utilizing a first set of the learned parameters of the neural network layers, generating, from the set of features utilizing the modified bias parameters of the two-dimensional bias map, a biased feature map, and generating, from the biased feature map utilizing the modified scale parameters of the convolutional sublayer, a scaled feature map. In these or other cases, the act 1108 involves generating, utilizing a second set of the learned parameters of the neural network layers, the refined digital image from the scaled feature map. In certain embodiments, the act 1108 involves.

In some embodiments, the series of acts 1100 includes an act of generating additional modified bias parameters for an additional two-dimensional bias map and additional modified scale parameters for an additional convolutional sublayer. Additionally, the series of acts 1100 includes an act of generating the refined digital image from the digital image utilizing the additional modified bias parameters for the additional two-dimensional bias map and the additional modified scale parameters for the additional convolutional sublayer.

In one or more embodiments, the series of acts 1100 includes an act of receiving a user interaction identifying one or more pixels for refining the modified digital image. Receiving the user interaction can include receiving a selection of a region of a digital image matte, receiving a selection to modify an image segment within a segmentation digital image, receiving a selection to modify depth of a region of a digital image depth map, receiving a selection of pixels to fill within an inpainted digital image, or receiving a selection to indicate style transfer within a stylized digital image. Receiving the user interaction can involve receiving a multi-pixel user interaction that indicates a plurality of pixels from the modified digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
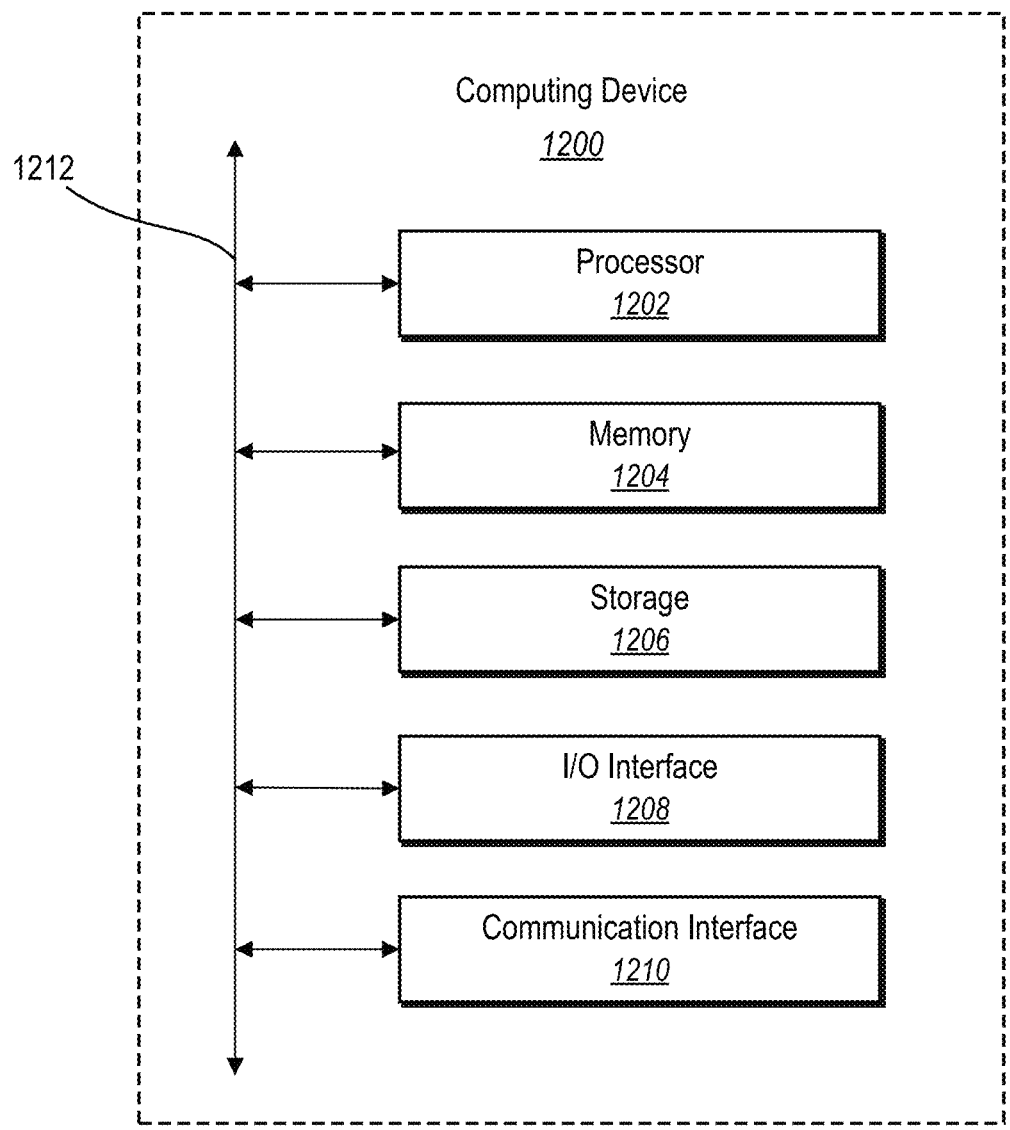
FIG. 12 illustrates a block diagram of an example computing device in accordance with one or more embodiments.

FIG. 12 illustrates, in block diagram form, an example computing device 1200 (e.g., the computing device 1000, the client device 108, and/or the server(s) 104) that may be configured to perform one or more of the processes described above. One will appreciate that the interactive image editing system 102 can comprise implementations of the computing device 1200. As shown by FIG. 12, the computing device can comprise a processor 1202, memory 1204, a storage device 1206, an I/O interface 1208, and a communication interface 1210. Furthermore, the computing device 1200 can include an input device such as a touchscreen, mouse, keyboard, etc. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a writing device or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause the at least one processor to:
   generate a modified digital image from a digital image utilizing a digital image neural network comprising neural network layers having learned parameters and a feature backpropagation refinement layer comprising a two-dimensional bias map having unlearned bias parameters and a convolutional sublayer having unlearned scale parameters;
   determine a measure of loss based on a user interaction with one or more pixels of the modified digital image;
   generate, utilizing the measure of loss, modified bias parameters of the two-dimensional bias map and modified scale parameters of the convolutional sublayer; and
   generate a refined digital image from the digital image utilizing one or more of the learned parameters of the neural network layers, the modified bias parameters of the two-dimensional bias map, and the modified scale parameters of the convolutional sublayer.

2. The non-transitory computer readable medium of claim 1, further comprising instructions that, when executed by the at least one processor, cause the at least one processor to determine the measure of loss by:

determining distances from the one or more pixels of the user interaction to other pixels within the modified digital image; and penalizing, according to the distances from the one or more pixels of the user interaction, refinement of pixels of the modified digital image farther from the user interaction.

3. The non-transitory computer readable medium of claim 1, further comprising instructions that, when executed by the at least one processor, cause the at least one processor to generate the modified bias parameters and the modified scale parameters by backpropagating within the digital image neural network to modify the unlearned bias parameters and the unlearned scale parameters to reduce the measure of loss determined based on the user interaction.

4. The non-transitory computer readable medium of claim 1, further comprising instructions that, when executed by the at least one processor, cause the at least one processor to generate the refined digital image by updating the one or more pixels of the user interaction and updating one or more additional pixels of the modified digital image in response to the user interaction according to the modified bias parameters and the modified scale parameters.

5. The non-transitory computer readable medium of claim 1, further comprising instructions that, when executed by the at least one processor, cause the at least one processor to generate the refined digital image by:
    extracting a set of features from the digital image utilizing a first set of the learned parameters of the neural network layers;
    generating, from the set of features utilizing the modified bias parameters of the two-dimensional bias map, a biased feature map; and
    generating, from the biased feature map utilizing the modified scale parameters of the convolutional sublayer, a scaled feature map.

6. The non-transitory computer readable medium of claim 5, further comprising instructions that, when executed by the at least one processor, cause the at least one processor to generate the refined digital image by generating, utilizing a second set of the learned parameters of the neural network layers, the refined digital image from the scaled feature map.

7. The non-transitory computer readable medium of claim 1, further comprising instructions that, when executed by the at least one processor, cause the at least one processor to generate the modified digital image utilizing the digital image neural network comprising the neural network layers having the learned parameters determined without utilizing sample user interactions during training for the digital image neural network.

8. The non-transitory computer readable medium of claim 1, further comprising instructions that, when executed by the at least one processor, cause the at least one processor to:
    generate additional modified bias parameters for an additional two-dimensional bias map and additional modified scale parameters for an additional convolutional sublayer; and
    generate the refined digital image from the digital image utilizing the additional modified bias parameters for the additional two-dimensional bias map and the additional modified scale parameters for the additional convolutional sublayer.

9. A system comprising:
    one or more memory devices comprising:
        a digital image, and
        a neural network comprising a plurality of neural network layers having learned parameters and further comprising a feature backpropagation refinement layer; and
    one or more processors that are configured to cause the system to:
        generate a modified digital image from the digital image utilizing the learned parameters of the plurality of neural network layers;
        in response to a user interaction with one or more pixels of the modified digital image, determine a consistency loss based on distances from the user interaction;
        generate modified parameters of the feature backpropagation refinement layer utilizing the consistency loss; and
        generate a refined digital image from the digital image utilizing one or more of the learned parameters of the plurality of neural network layers and the modified parameters of the feature backpropagation refinement layer.

10. The system of claim 9, wherein the one or more processors are further configured to cause the system to determine the consistency loss by:
    determining, within a feature map, distances between one or more features corresponding to the one or more pixels of the user interaction and features corresponding to other pixels of the modified digital image;
    penalizing refinement of a first feature in the feature map utilizing a first penalty according to a first distance of the first feature from the one or more features corresponding to the one or more pixels; and
    penalizing refinement of a second feature in the feature map utilizing a second penalty larger than the first penalty according to a second distance, larger than the first distance, of the second feature from the one or more features corresponding to the one or more pixels.

11. The system of claim 9, wherein the one or more processors are further configured to cause the system to generate the modified digital image utilizing the feature backpropagation refinement layer comprising a convolutional sublayer having a first dimension corresponding to a number of feature channels extracted via the plurality of neural network layers and having a second dimension corresponding to a dimension of the digital image.

12. The system of claim 9, wherein the one or more processors are further configured to cause the system to generate the modified digital image utilizing the learned parameters of the plurality of neural network layers together with unlearned bias parameters of a bias sublayer within the feature backpropagation refinement layer and unlearned scale parameters of a convolutional sublayer within the feature backpropagation refinement layer.

13. The system of claim 9, wherein the one or more processors are further configured to cause the system to generate the modified parameters of the feature backpropagation refinement layer comprising a bias sublayer and a convolutional sublayer by generating modified bias parameters for the bias sublayer and modified scale parameters for the convolutional sublayer according to the consistency loss.

14. The system of claim 13, wherein the one or more processors are further configured to cause the system to generate the modified bias parameters for the bias sublayer comprising a bias map having dimensions corresponding to dimensions of the digital image or dimensions of a feature map representing the digital image.

15. The system of claim 9, wherein the one or more processors are further configured to cause the system to generate the modified digital image utilizing the plurality of neural network layers and the feature backpropagation refinement layer comprising a plurality of two-dimensional bias maps.

16. The system of claim 9, wherein the one or more processors are further configured to cause the system to:
determine, in response to an additional user interaction with one or more additional pixels, a relationship loss between the one or more pixels indicated by the user interaction and the one or more additional pixels indicated by the additional user interaction; and
generate the modified parameters of the feature backpropagation refinement layer from the consistency loss and the relationship loss.

17. A computer-implemented method comprising:
generating a modified digital image from a digital image utilizing a non-interactive digital image neural network comprising neural network layers having learned parameters and a feature backpropagation refinement layer having unlearned initialization parameters;
receiving a user interaction identifying one or more pixels for refining the modified digital image;
performing a step for generating modified parameters for the feature backpropagation refinement layer; and
generating a refined digital image utilizing the non-interactive digital image neural network based on the user interaction utilizing the modified parameters of the feature backpropagation refinement layer.

18. The computer-implemented method of claim 17, wherein receiving the user interaction comprises one of receiving a selection of a region of a digital image matte, receiving a selection to modify an image segment within a segmentation digital image, receiving a selection to modify depth of a region of a digital image depth map, receiving a selection of pixels to fill within an inpainted digital image, or receiving a selection to indicate style transfer within a stylized digital image.

19. The computer-implemented method of claim 17, wherein generating the modified digital image comprises utilizing the non-interactive digital image neural network that includes the feature backpropagation refinement layer comprising a bias sublayer having unlearned bias parameters and further comprising a convolutional sublayer having unlearned scale parameters.

20. The computer-implemented method of claim 17, wherein receiving the user interaction comprises receiving a multi-pixel user interaction that indicates a plurality of pixels from the modified digital image.

\* \* \* \* \*